US012782524B2

(12) United States Patent
Moorkanikara-Nageswaran

(10) Patent No.: US 12,782,524 B2
(45) Date of Patent: Nov. 3, 2026

(54) SYSTEMS AND METHODS FOR FILTERING UNDERESTIMATED DISTANCE MEASUREMENTS FROM PERIODIC PULSE-MODULATED TIME-OF-FLIGHT SENSORS

(71) Applicant: Brain Corporation, San Diego, CA (US)

(72) Inventor: Jayram Moorkanikara-Nageswaran, San Diego, CA (US)

(73) Assignee: Brain Corporation, San Diego, CA (US)

( * ) Notice: Subject to any disclaimer, the term of this patent is extended or adjusted under 35 U.S.C. 154(b) by 1223 days.

(21) Appl. No.: 17/532,125

(22) Filed: Nov. 22, 2021

(65) Prior Publication Data

US 2022/0163644 A1 May 26, 2022

Related U.S. Application Data

(60) Provisional application No. 63/117,125, filed on Nov. 23, 2020.

(51) Int. Cl.
*G01S 7/4865* (2020.01)
*G01S 7/48* (2006.01)
*G01S 17/894* (2020.01)

(52) U.S. Cl.
CPC .......... *G01S 7/4865* (2013.01); *G01S 7/4808* (2013.01); *G01S 17/894* (2020.01)

(58) Field of Classification Search
CPC ............................ G01S 7/4808; G01S 17/894
See application file for complete search history.

(56) References Cited

U.S. PATENT DOCUMENTS 5,111,401 A 5/1992 Everett, Jr. et al.
5,696,675 A 12/1997 Nakamura et al.
5,758,298 A 5/1998 Guldner
(Continued)

FOREIGN PATENT DOCUMENTS

EP 1240562 B1 6/2004
EP 2343615 B1 10/2018
(Continued)

OTHER PUBLICATIONS

Carlos Estrada, et al., Hierarchical SLAM: Real-Time Accurate Mapping of Large Environments, 21 IEEE Transactions on Robotics 588; Aug. 2005.
(Continued)

*Primary Examiner* — Catherine T. Rastovski
*Assistant Examiner* — Nyla Gavia
(74) *Attorney, Agent, or Firm* — Pierson Ferdinand LLP; Sidharth Kapoor

(57) ABSTRACT

Systems and methods for filtering underestimated distance measurements from pulse-modulated time of flight sensor are disclosed herein. According to at least one non-limiting exemplary embodiment, a cluster of pixels in a depth image may be identified as having incorrect distance measurements based on a set of pre-defined criteria disclosed herein. The incorrect distance measurements may be filtered from the image such that robots using depth cameras do not perceive objects as being substantially close to the robots when no objects are present.

15 Claims, 13 Drawing Sheets

(56) References Cited

U.S. PATENT DOCUMENTS

| | | | | |
|---|---|---|---|---|
| 5,793,900 | A | 8/1998 | Nourbakhsh et al. | |
| 5,793,934 | A | 8/1998 | Bauer | |
| 6,667,592 | B2 | 12/2003 | Jacobs et al. | |
| 7,170,252 | B2 | 1/2007 | Maeki | |
| 7,502,065 | B2 | 3/2009 | Nakahara | |
| 7,965,890 | B2 | 6/2011 | Marcus et al. | |
| 8,185,239 | B2 | 5/2012 | Teng et al. | |
| 8,300,890 | B1 | 10/2012 | Gaikwad et al. | |
| 8,542,875 | B2 | 9/2013 | Eswara | |
| 8,682,087 | B2 * | 3/2014 | Tian | H04N 19/82 382/233 |
| 8,903,589 | B2 | 12/2014 | Sofman et al. | |
| 8,918,241 | B2 | 12/2014 | Chen et al. | |
| 8,948,913 | B2 | 2/2015 | Choi et al. | |
| 8,954,191 | B2 | 2/2015 | Yi et al. | |
| 9,072,929 | B1 * | 7/2015 | Rush | H04N 13/257 |
| 9,076,214 | B2 | 7/2015 | Tsutsumi | |
| 9,122,948 | B1 | 9/2015 | Zhu et al. | |
| 9,174,672 | B2 | 11/2015 | Zeng et al. | |
| 9,192,869 | B2 | 11/2015 | Moriya | |
| 9,208,384 | B2 | 12/2015 | Conwell et al. | |
| 9,216,745 | B2 | 12/2015 | Beardsley et al. | |
| 9,233,472 | B2 | 1/2016 | Angle et al. | |
| 9,286,810 | B2 | 3/2016 | Eade et al. | |
| 9,304,001 | B2 | 4/2016 | Park et al. | |
| 9,380,922 | B2 | 7/2016 | Duffley et al. | |
| 9,400,501 | B2 | 7/2016 | Schnittman | |
| 9,404,756 | B2 | 8/2016 | Fong et al. | |
| 9,519,289 | B2 | 12/2016 | Munich et al. | |
| 9,534,899 | B2 | 1/2017 | Gutmann et al. | |
| 9,538,892 | B2 | 1/2017 | Fong et al. | |
| 9,864,377 | B2 | 1/2018 | Welty et al. | |
| 9,910,444 | B2 | 3/2018 | Eade et al. | |
| 9,952,053 | B2 | 4/2018 | Fong et al. | |
| 10,093,021 | B2 | 10/2018 | Aghamohammadi et al. | |
| 10,209,063 | B2 | 2/2019 | Anderson-Sprecher | |
| 10,383,497 | B2 | 8/2019 | Han et al. | |
| 10,667,664 | B2 | 6/2020 | Sheikh et al. | |
| 11,209,528 | B2 * | 12/2021 | Mathy | G01S 17/894 |
| 11,927,965 | B2 | 3/2024 | Ebrahimi Afrouzi et al. | |
| 2004/0117079 | A1 | 6/2004 | Hulden | |
| 2006/0188168 | A1 | 8/2006 | Sheraizin et al. | |
| 2008/0059015 | A1 | 3/2008 | Whittaker et al. | |
| 2008/0294338 | A1 | 11/2008 | Doh et al. | |
| 2012/0121161 | A1 | 5/2012 | Eade et al. | |
| 2013/0060540 | A1 * | 3/2013 | Frahm | G06T 15/06 703/2 |
| 2013/0226344 | A1 * | 8/2013 | Wong | G05D 1/0242 901/1 |
| 2015/0261223 | A1 | 9/2015 | Fong et al. | |
| 2019/0113606 | A1 * | 4/2019 | Mathy | G01S 17/894 |
| 2020/0225673 | A1 * | 7/2020 | Ebrahimi Afrouzi | A47L 11/4011 |
| 2020/0226765 | A1 * | 7/2020 | Wood | G06V 10/147 |

FOREIGN PATENT DOCUMENTS

| | | | |
|---|---|---|---|
| JP | 3265212 | B2 | 3/2002 |
| JP | 2009216600 | A | 9/2009 |
| JP | 2009288930 | A | 12/2009 |
| JP | 5769455 | B2 | 8/2015 |
| KR | 10-2010-0027683 | A | 3/2010 |
| KR | 101048098 | B1 | 7/2011 |
| WO | 2011146259 | A2 | 11/2011 |

OTHER PUBLICATIONS

Tim Bailey and Hugh Durrant-Whyte, Simultaneous Localization and Mapping (SLAM): Part II, IEEE Robotics & Optimization Magazine; Sep. 2006.

Seongsoo Lee and Sukhan Lee, Embedded visual SLAM: Applications for low-cost consumer robots, 20 IEEE Robotics & Automation Magazine 83; 2013.

J.A. Castellanos, J. Montiel, J. Neira, J.D Tardos, The SPmap: A probabilistic framework for simultaneous localization and map building, 15(5) IEEE Trans. Robotics and Automation 948-952; 1999.

J. Scholz, S. Chitta, B. Marthi, M. Likhachev, Cart Pushing with a Mobile Manipulation System: Towards Navigation with Moveable Objects, IEEE International Conference on Robotics and Automation 6115-6120; 2011.

Neato XV-11.

Neato XV Signature Pro.

IRobot Roomba 880.

Karcher RoboCleaner RC3000.

The Dottie.

Orazio.

IRobot Scooba.

Kiva Systems (n/k/a Amazon Robotics).

Locus Robotics.

Google Self-Driving Car Project (n/k/a Waymo).

BMW M235i.

Avidbots ARS-2.

Avidbots Neo.

Internet Archives, WayBackMachine; http://www.neatorobotics.com/buy.html; Catured date: Jan. 23, 2010.

How Waterloo became a world-class robotics hub - The Globe and Mail; https://www.theglobeandmail.com/report-on-business/rob-magazine/how-waterloo-became-a-world-class-robotics-hub/article29784283/; Accessed Mar. 15, 2025.

News Release, iRobot Enters the Smart Home with Roomba® 980 Vacuum Cleaning Robot, Date: Sep. 16, 2015.

News Release, iRobot Expands Connected Product Line with Roomba® 960; Date: Aug. 4, 2016.

E. Eade, P. Fong and M. E. Munich, "Monocular graph SLAM with complexity reduction," 2010 IEEE/RSJ International Conference on Intelligent Robots and Systems, Taipei, Taiwan, 2010, pp. 3017-3024.

Internet Archives, WayBackMachine; http://www.neatorobotics.com/faq.html; captured Jan. 24, 2010.

Neato XV-11 Robotic All-Floor Vacuum System; 2009.

Neato XV-11™ Vacuum User's Guide; Jan. 30, 2010.

Chang, Ya-Chun and Yoshio Yamamoto. "On-line path planning strategy integrated with collision and dead-lock avoidance schemes for wheeled mobile robot in indoor environments." Ind. Robot 35 (2008): 421-434.

Internet Archives, WayBackMachine; http://www.robotreviews.com/reviews/review-of-the-neato-xv-11-the-roomba-killer; Catured date: Sep. 23, 2010.

Basic Research Series: Optical Information Technology State-of-the-Art Report; Publication date 1993.

Bernard Feverjon et al., A local based approach for path planning of manipulators with a high number of degrees of freedom. Proceedings. 1987 IEEE International Conference on Robotics and Automation 4 (1987): 1152-1159.

Brett R. Fajen et al., A Dynamical Model of Visually-Guided Steering, Obstacle Avoidance, and Route Selection. International Journal of Computer Vision 54 (2003): 13-34.

Christoph Rosmann et al., Efficient Trajectory Optimization Using a Spares Model. 2013 Eur. Conf. on Mobile Robots; Sep. 2013.

Dave Ferguson et al., Planning Long Dynamically Feasible Maneuvers for Autonomous Vehicles, Int'l J. of Robotics Research, vol. 28(8); Jun. 26, 2009.

David G. Lowe, Object Recognition from Local Scale-Invariant Features; 1999.

Dieter Fox et al., The Dynamic Window Approach to Collision Avoidance, IEEE Robotics and Automation Magazine, vol. 4(1); Apr. 1997.

Francisco Amoros et al., Global Appearance Applied to Visual Map Building and Path Estimation Using Multiscale Analysis, Hindawi Publishing Corporation, Mathematical Problems in Engineering, vol. 2014 Article ID 365417; Jul. 22, 2014.

Gany Berkovic and Ehud Shafir, Optical Methods for Distance and Displacement Measurements; Sep. 11, 2012.

Handbook of Optical Systems, vol. 4: Survey of Optical Instruments; 2008.

(56) References Cited

OTHER PUBLICATIONS

Hani Safadi, Local Path Planning Using Virtual Potential Field, McGill University School of Computer Science; Apr. 18, 2007.
J.M. Rueger, Electronic Distance Measurement, 3rd Ed.; 1990.
J.M. Rueger, Electronic Distance Measurement, 4th Ed.; 1996.
Kazushi Nakazawa et al., Movement Control of Accompanying Robot Based on Artificial Potential Field Adapted to Dynamic Environments, Elec. Engin. in Japan, vol. 192; Feb. 2014.
Khalid Yousif et al., An Overview to Visual Odometry and Visual SLAM: Applications to Mobile Robotics, Intell. Ind. Syst. vol. 1, 289; Nov. 13, 2015.
Laurent Itti, Christof Koch, and Ernst Niebur, A Model of Saliency-Based Visual Attention for Rapid Scene Analysis; Nov. 1998.
Lina J. Karam, Nabil G. Sadaka, Rony Ferzli, and Zoran A. Ivanovski, An Efficient Selective Perceptual-Based Super-Resolution Estimator; Dec. 2011.
Lu and Milios, Globally Consistent Range Scan Alignment for Environment Mapping, Autonomous robots, 4 Autonomous robots 333-49 (1997).
Lu Yin et al., A New Potential Field Method for Mobile Robot Path Planning in the Dynamic Environments, Asian J. of Conti ol vol. 11(2); Mar. 2009.
Matthias Nieuwenhuisen et al., Predictive Potential Field-Based Collision Avoidance for Multicopters, Remote Sensing and Spatial Information Sciences, vol. XL-1; Sep. 4, 2013.
Mejdl Safran and Steven Haar, Arduino and Android Powered Object Tracking Robot; Nov. 27, 2012.
Oscar Montiel et al., Optimal Path Planning Generation for Mobile Robots Using Parallel Evolutionary Artificial Potential Field, J. Intell. Robot Sys.; Sep. 20, 2014.
Oussama Khatib, Real-Time Obstacle Avoidance for Manipulators and Mobile Robots Int'l J. of Robotics Research, vol. 5(1); 1986.
P. Payeur, Improving Robot Path Planning Efficiency with Probabilistic Virtual Environment Models. IEEE Int'l Conf on Virtual Environments; Jul. 2004.
Peter Biber and Wolfgang StraBer, nScan-Matching: Simultaneous Matching of Multiple Scans and Application to SLAM, Proceedings 2006 IEEE International Conference on Robotics and Automation, 2006.
Pierre Melchior et al., Robust Path Planning for Mobile Robot Based on Fractional Attractive Force. 2009 American Control Conf.; Jun. 2009.
Qian Jia & Xingsong Wang, An Improved Potential Field Method for Path Planning, 2010 Chinese Control and Decision Conference; 2010.
Qian Xu, Chaitali Chakrabarti, and Lina J. Karam, A Distributed Canny Edge Detector and its Implementation on FGPA; 2011.
Richard Szeliski, Image Alignment and Stitching: A Tutorial, Foundations and Trends in Computer vol. 2; 2006.
Sean Quinlan & Oussama Khatib, Elastic Bands: Connecting Path Planning and Control, IEEE Int'l Conference on Robotics and Automation; 1998.
Srenivas Varadarajan and Lina J. Karam, An Improved Perception-Based No-Reference Objective Image Sharpness Metric Using Iterative Edge Refinement; 2008.
Srenivas Varadarajan, Chaitali Chakrabarti, Lina J. Karam, and Judit Maitinez Bauza, A Distributed Psycho-Visually Motivated Canny Edge Detector; 2010.
Srenivas Varadarajan, Lina J. Karam, and Dinei Florencio, Background Recovery from Video Sequences Using Motion Parameters; 2009.
Stachniss et al., Springer Handbook of Robotics, Chapter 46: Simultaneous Localization and Mapping, Springer (2d ed.); Jan. 1, 2016.
Prassler et al., Springer Handbook of Robotics, Chapter 65: Domestic Robots, Springer (2d ed.); Jan. 1, 2016.
Suzuki and Abe, Topological Structural Analysis of Digitized Binary Images by Border Following; 1983.
Wang Tianmiao et al., Mobile Robot Control Based on Dynamic Potential, Chinese J. of Sys. Engin. & Elec. vol. 3; Mar. 31, 1992.
Ya-Chun Chang & Yoshio Yamamoto, Path Planning of Wheeled Mobile Robot with Simultaneous Free Space Locating Capability, Int'l Serv. Robotics; Nov. 25, 2008.
Yong K. Hwang & Narenda Ahuja, A Potential Field Approach to Path Planning, IEEE Transactions on Robotics and Automation vol. 8(1); Feb. 1992.
Wolfgang Hess et al., Real-time loop closure in 2D Lidar Slam, 2016 IEEE International Conference on Robotics and Automation; May 16-21, 2016.
Zhenyu Wu et al., Collision Avoidance for Mobile Robots Based on Artificial Potential Field and Obstacle Envelope Modelling, Assembly Automation, vol. 36(3); Aug. 1, 2016.
Kaiqi Huang, Liangsheng Wang, Tieniu Tan, and Steve Maybank, A Real-Time Object Detecting and Tracking System for Outdoor Night Surveillance; 2008.
Subramanian Saravankumar et al., Multipoint potential field method for path planning of autonomous underwater vehicles in 3D space, Intel Serv Robots 2013; Oct. 6, 2013.
Javier Minguez et al., Abstracting Vehicle Shape and Kinematic Constraints from Obstacle Avoidance Methods, Autonomous Robots, vol. 20(1); Feb. 3, 2006.
Alan Conrad Bovik, Marianna Clark, Wilson S. Geisler, Multichannel Texture Analysis Using Localized Spatial Filters; Jan. 1990.
John Canny, A Computational Approach to Edge Detection, IEEE Transactions on Pattern Analysis and Machine Intelligence, vol. PAMI- 8, No. 6; Nov. 1986.
Edwin B. Olson, Robust and Efficient Robotic Mapping, Massachusetts Institute of Technology; 2008.
Giorgio Grisetti, et al, Nonlinear Constraint Network Optimization for Efficient Map Learning, 10 IEEE Transactions on Intelligent Transportation Systems 428; Sep. 2009.
Edwin Olson, et al, Fast Iterative Alignment of Pose Graphs with Poor Initial Estimates, Proceedings of the 2006 IEE Conference on Robotics and Automation; May 2006.
John Folkesson and Henrik I. Christensen, Closing the Loop with Graphical SLAM 23 IEEE Transactions on Robotics 731; Aug. 2007.

* cited by examiner

SYSTEMS AND METHODS FOR FILTERING UNDERESTIMATED DISTANCE MEASUREMENTS FROM PERIODIC PULSE-MODULATED TIME-OF-FLIGHT SENSORS

PRIORITY

This application claims the benefit of U.S. provisional patent application No. 63/117,125 filed Nov. 23, 2020, under 35 U.S.C. § 119, the entire disclosure of which is incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

SUMMARY

The present application relates generally to robotics, and more specifically to systems and methods for filtering underestimated distance measurements from periodic pulse-modulated time of flight sensors.

The foregoing needs are satisfied by the present disclosure, which provides for, inter alia, systems and methods for filtering underestimated distance measurements from periodic pulse-modulated time of flight sensors.

Exemplary embodiments described herein have innovative features, no single one of which is indispensable or solely responsible for their desirable attributes. Without limiting the scope of the claims, some of the advantageous features will now be summarized. One skilled in the art would appreciate that, as used herein, the term robot may generally refer to an autonomous vehicle or object that travels a route, executes a task, or otherwise moves automatically upon executing or processing computer-readable instructions.

According to at least one non-limiting exemplary embodiment, a robotic system for removing erroneous distance measurements from a sensor is disclosed. The robotic system comprises: at least one depth camera; a non-transitory computer readable storage medium comprising a plurality of computer-readable instructions embodied thereon; and a controller, configured to execute the computer-readable instructions to: receive a depth image from the depth camera; segment the image into a plurality of groups based on at least one of color values or distance values of the depth image, each group comprises one or more pixels of the image and one or more respective distance measurements; determine if a respective group of the plurality of groups meets the following criterion: (i) the respective group is within a specified region of a field of view of the depth camera; (i) the respective group comprises an aspect ratio within specified bounds; and (iii) the respective group does not touch the border of the depth image; and filter the respective group from the depth image to produce a filtered depth image if the respective group meets the criterion.

According to at least one non-limiting exemplary embodiment, the controller is further configured to execute the computer-readable instructions to: utilize the distance measurements of the filtered depth image to produce a computer readable map, the computer readable map being utilized by the controller to navigate the robotic system.

According to at least one non-limiting exemplary embodiment the specified bounds of the aspect ratio include a minimum value of at least one pixel.

According to at least one non-limiting exemplary embodiment the depth image include a persistent region and the specified region, the persistent region corresponding to a portion of the field of view which is within a maximum range of the depth camera, the specified region includes the remaining portion of the field of view.

According to at least one non-limiting exemplary embodiment the robotic system operates upon a floor; and the persistent region corresponds to the portion of the field of view which includes the floor within the maximum range of the depth camera.

According to at least one non-limiting exemplary embodiment, a non-transitory computer readable storage medium comprising a plurality of computer-readable instructions embodied thereon is disclosed. The instructions, when executed by at least one controller of a robot, cause the robot to: receive a depth image from a depth camera coupled to the robot; segment the depth image into a plurality of groups based on at least one of color values or distance values of the depth image, each group includes one or more pixels of the image and one or more respective distance measurements; determine if one or more the groups meets the following criterion: (i) the group is within a specified region of a field of view of the depth camera; (ii) the group includes an aspect ratio within specified bounds; and (iii) the group does not touch the border of the depth image; upon the group meeting the criterion, filter the group from the depth image to produce a filtered depth image; and utilize the distance measurements of the filtered depth image to produce a computer readable map, the computer readable map being utilized by the controller to navigate the robot; wherein, the specified bounds of the aspect ratio include a minimum value of at least one pixel; the depth image include a persistent region and the specified region, the persistent region corresponding to a portion of the field of view which is within a maximum range of the depth camera, the specified region includes the remaining portion of the field of view; the robot operates upon a floor; and the persistent region corresponds to the portion of the field of view which includes the floor within the maximum range of the depth camera.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an," and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

Figure 1A:
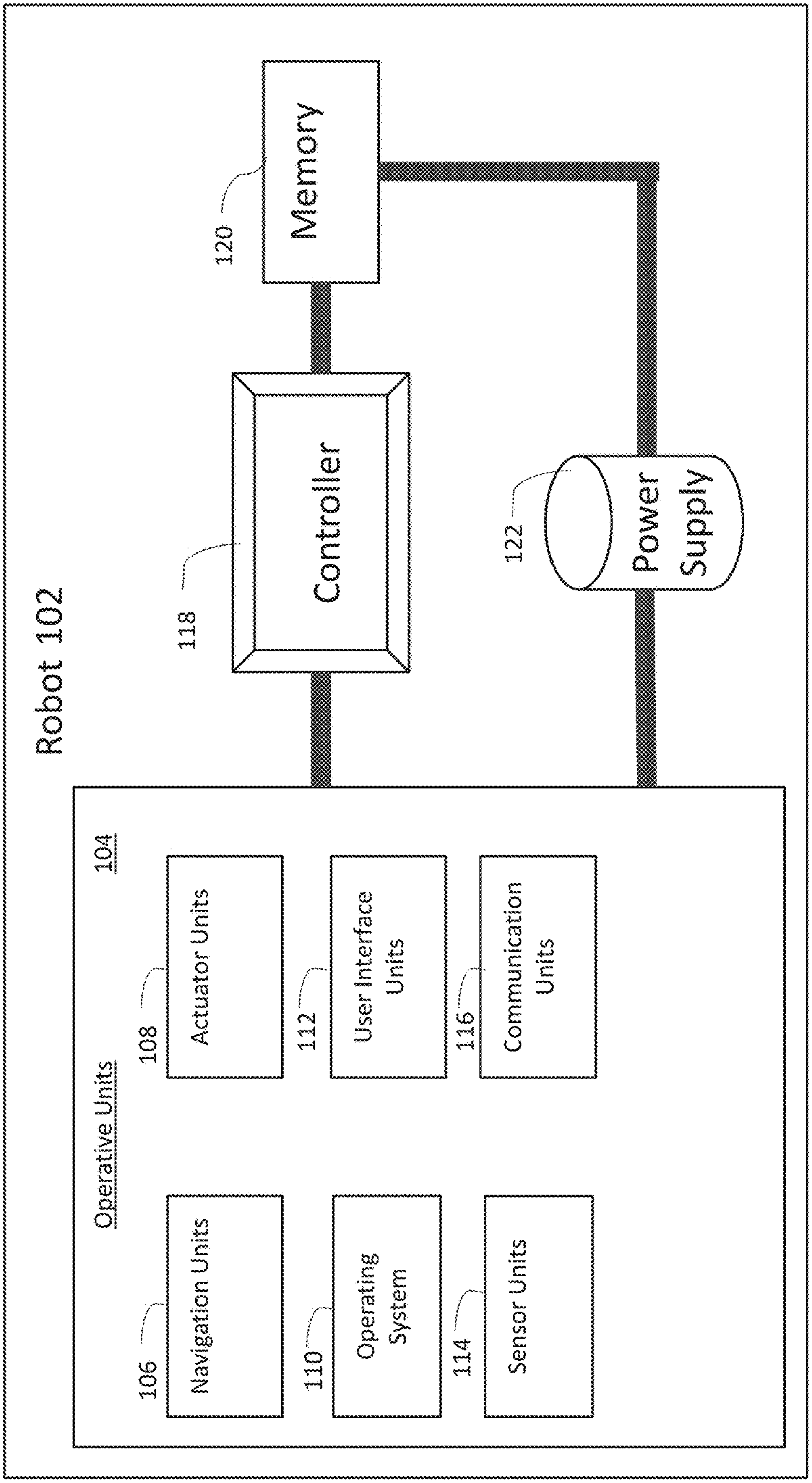
FIG. 1A is a functional block diagram of a robot in accordance with some embodiments of this disclosure.

All Figures disclosed herein are © Copyright 2021 Brain Corporation. All rights reserved.

DETAILED DESCRIPTION

Currently, many robots utilize depth cameras and other time of flight ("ToF") sensors, such as scanning light detection and ranging ("LiDAR") sensors (i.e., planar LiDAR), to perceive their external environments. Typically, depth cameras and/or other ToF sensors do not directly measure the travel time of light but rather measure a phase difference between an output modulated waveform and a received input modulated waveform. Measuring ToF using a phase difference may enable circuitry of the depth cameras to operate substantially slower (e.g., at MHz rather than tens of GHz), thereby making these sensors affordable for commercial robotic devices. In many embodiments of these sensors, however, the modulated emission pattern is cyclic, wherein the period of the emission pattern is based on the maximum range of the sensor. This may cause the sensors to incorrectly perceive objects as being substantially closer to the sensors when, in reality, the objects are beyond the maximum range of the sensors. This is further explained in FIGS. 2-3 below using an illustrative example. When in use by a robot, incorrectly localizing an object as being substantially close to the sensor (i.e. underestimating the distance), and thereby close to the robot, may cause the robot to stop when no object is present. A robot stopping may interfere with its efficiency, task performance, and humans who may be unnecessarily called to assist the robots only to find the robot has stopped for no apparent reason. Accordingly, there is a need in the art to detect and filter incorrectly localized objects by depth cameras in use by robotic devices.

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for systems and methods for filtering underestimated distance measurements from periodic pulse-modulated time of flight sensors. As used herein, a robot may include mechanical and/or virtual entities configured to carry out a complex series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, scooters, self-balancing vehicles such as manufactured by Segway, etc.), trailer movers, vehicles, and the like. Robots may also include any autonomous and/or semi-autonomous machine for transporting items, people, animals, cargo, freight, objects, luggage, and/or anything desirable from one location to another.

As used herein, network interfaces may include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, 4G, 5G, LTE/LTE-A/TD-LTE/TD-LTE, GSM, etc.), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

As used herein, processor, microprocessor, and/or digital processor may include any type of digital processor such as, without limitation, digital signal processors ("DSPs"), reduced instruction set computers ("RISC"), complex instruction set computers ("CISC") processors, microprocessors, gate arrays (e.g., field programmable gate arrays ("FPGAs")), programmable logic device ("PLDs"), reconfigurable computer fabrics ("RCFs"), array processors, secure microprocessors, and application-specific integrated circuits ("ASICs"). Such digital processors may be contained on a single unitary integrated circuit die or distributed across multiple components.

As used herein, computer program and/or software may include any sequence or human- or machine-cognizable steps which perform a function. Such computer program and/or software may be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot. Myriad other embodiments or uses for the technology described herein would be readily envisaged by those having ordinary skill in the art, given the contents of the present disclosure.

Advantageously, the systems and methods of this disclosure at least: (i) enable robots using pulse-modulated time of flight sensors to remove incorrectly localized objects, (ii) improve robotic task performance, (iii) improve robotic mapping and localization, and (iv) enable robotic behavior to be more predictable as perceived by humans. Other advantages are readily discernable by one having ordinary skill in the art given the contents of the present disclosure.

FIG. 1A is a functional block diagram of a robot 102 in accordance with some principles of this disclosure. As illustrated in FIG. 1A, robot 102 may include controller 118, memory 120, user interface unit 112, sensor units 114, navigation units 106, actuator unit 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure.

Controller 118 may control the various operations performed by robot 102. Controller 118 may include and/or comprise one or more processors (e.g., microprocessors) and other peripherals. As previously mentioned and used herein, processor, microprocessor, and/or digital processor may include any type of digital processing device such as, without limitation, digital signal processing devices ("DSPs"), reduced instruction set computers ("RISC"), complex instruction set computers ("CISC"), microprocessors, gate arrays (e.g., field programmable gate arrays ("FPGAs")), programmable logic device ("PLDs"), reconfigurable computer fabrics ("RCFs"), array processors, secure microprocessors and application-specific integrated circuits ("ASICs"). Peripherals may include hardware accelerators configured to perform a specific function using hardware elements such as, without limitation, encryption/description hardware, algebraic processors (e.g., tensor processing units, quadradic problem solvers, multipliers, etc.), data compressors, encoders, arithmetic logic units ("ALU"), and the like. Such digital processors may be contained on a single unitary integrated circuit die, or distributed across multiple components.

Controller 118 may be operatively and/or communicatively coupled to memory 120. Memory 120 may include any type of integrated circuit or other storage device configured to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RL-DRAM"), static RAM ("SRAM"), flash memory (e.g., NAND/NOR), memristor memory, pseudostatic RAM ("PSRAM"), etc. Memory 120 may provide instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the instructions may be configured to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processor may be internal to or on board robot 102 and/or may be external to robot 102 and be communicatively coupled to controller 118 of robot 102 utilizing communication units 116 wherein the external processor may receive data from robot 102, process the data, and transmit computer-readable instructions back to controller 118. In at least one non-limiting exemplary embodiment, the processor may be on a remote server (not shown).

In some exemplary embodiments, memory 120, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configured to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. As yet another exemplary embodiment, various robots (e.g., that are commonly associated, such as robots by a common manufacturer, user, network, etc.) may be networked so that data captured by individual robots are collectively shared with other robots. In such a fashion, these robots may be configured to learn and/or share sensor data in order to facilitate the ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processors. In some embodiments, a single controller (e.g., controller 118) may serve as the various controllers and/or processors described. In other embodiments different controllers and/or processors may be used, such as controllers and/or processors used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 includes at least navigation units 106, actuator units 108, user interface units 112, sensor units 114, and communication units 116. Operative units 104 may also comprise other units such as specifically configured task units (not shown) that provide the various functionality of robot 102. In exemplary embodiments, operative units 104 may be instantiated in software, hardware, or both software and hardware. For example, in some cases, units of operative units 104 may comprise computer-implemented instructions executed by a controller. In exemplary embodiments, units of operative units 104 may comprise hardcoded logic (e.g., ASICS). In exemplary embodiments, units of operative units 104 may comprise both computer-implemented instructions executed by a controller and hardcoded logic. Where operative units 104 are implemented in part in software, operative units 104 may include units/modules of code configured to provide one or more functionalities.

In exemplary embodiments, navigation units 106 may include systems and methods that may computationally construct and update a map of an environment, localize robot 102 (e.g., find the position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configured to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators such as electric motors, gas motors, driven magnet systems, solenoid/ratchet systems, piezoelectric systems (e.g., inchworm motors), magnetostrictive elements, gesticulation, and/or any way of driving an actuator known in the art. By way of illustration, such actuators may actuate the wheels for robot 102 to navigate a route; navigate around obstacles; rotate cameras and sensors. According to exemplary embodiments, actuator unit 108 may include systems that allow movement of robot 102, such as motorized propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location.

Actuator unit 108 may also include any system used for actuating, in some cases actuating task units to perform tasks. For example, actuator unit 108 may include driven magnet systems, motors/engines (e.g., electric motors, combustion engines, steam engines, and/or any type of motor/engine known in the art), solenoid/ratchet system, piezoelectric system (e.g., an inchworm motor), magnetostrictive elements, gesticulation, and/or any actuator known in the art.

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LiDAR") sensors, radars, lasers, cameras (including video cameras (e.g., red-blue-green ("RBG") cameras, infrared cameras, three-dimensional ("3D") cameras, thermal cameras, etc.), time of flight ("ToF") cameras, structured light cameras, antennas, motion detectors, microphones, and/or any other sensor known in the art. According to some exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on distance or height measurements. Such data may be stored in data structures, such as matrices, arrays, queues, lists, stacks, bags, etc.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configured to determine the odometry of robot 102. For example, sensor units 114 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, stacks, bags, etc. According to exemplary embodiments, the data structure of the sensor data may be called an image.

According to exemplary embodiments, sensor units 114 may be in part external to the robot 102 and coupled to communications units 116. For example, a security camera within an environment of a robot 102 may provide a controller 118 of the robot 102 with a video feed via wired or wireless communication channel(s). In some instances, sensor units 114 may include sensors configured to detect a presence of an object at a location such as, for example without limitation, a pressure or motion sensor may be disposed at a shopping cart storage location of a grocery store, wherein the controller 118 of the robot 102 may utilize data from the pressure or motion sensor to determine if the robot 102 should retrieve more shopping carts for customers.

According to exemplary embodiments, user interface units 112 may be configured to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium), mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments user interface units 112 may be positioned on the body of robot 102. According to exemplary embodiments, user interface units 112 may be positioned away from the body of robot 102 but may be communicatively coupled to robot 102 (e.g., via communication units including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configured to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configured to send/receive signals utilizing a transmission protocol over wired connections, such as any cable that has a signal line and ground. For example, such cables may include Ethernet cables, coaxial cables, Universal Serial Bus ("USB"), FireWire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configured to send and receive signals comprising numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configured to send and receive statuses, commands, and other data/information. For example, communications unit 116 may communicate with a user operator to allow the user to control robot 102.

Communications unit 116 may communicate with a server/network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In exemplary embodiments, operating system 110 may be configured to manage memory 120, controller 118, power supply 122, modules in operative units 104, and/or any software, hardware, and/or features of robot 102. For example, and without limitation, operating system 110 may include device drivers to manage hardware recourses for robot 102.

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to some exemplary embodiments, one or more of these units may be part of an attachable module. This module may be attached to an existing apparatus to automate so that it behaves as a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used herein, a robot 102, a controller 118, or any other controller, processor, or robot performing a task, operation or transformation illustrated in the figures below comprises a controller executing computer-readable instructions stored on a non-transitory computer-readable storage apparatus, such as memory 120, as would be appreciated by one skilled in the art.

Figure 1B:
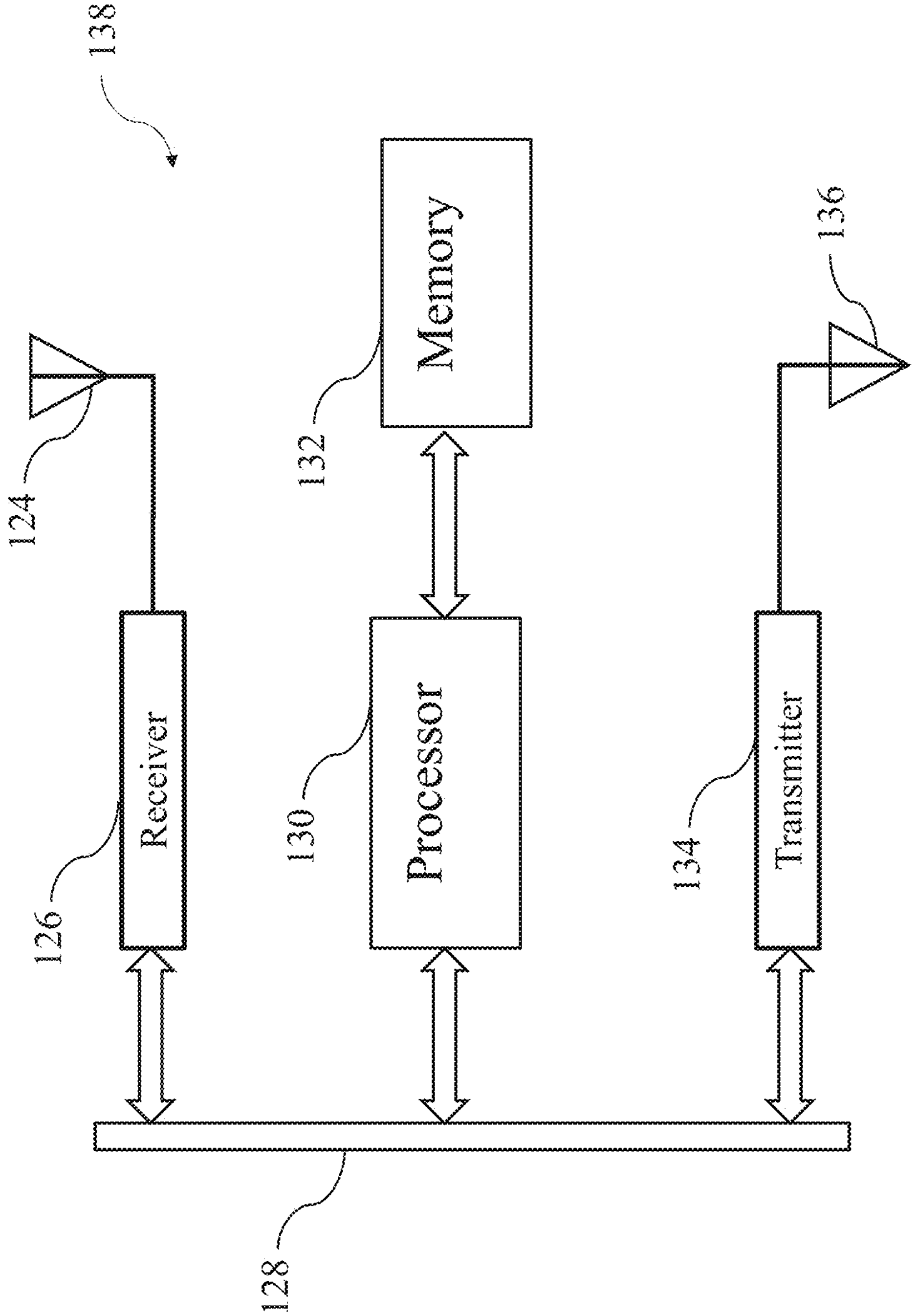
FIG. 1B is a functional block diagram of a processor or processing device in accordance with some embodiments of this disclosure.

Next referring to FIG. 1B, the architecture of a processor or processing device 138 is illustrated according to an exemplary embodiment. As illustrated in FIG. 1B, the processor 138 includes a data bus 128, a receiver 126, a transmitter 134, at least one processor 130, and a memory 132. The receiver 126, the processor 130 and the transmitter 134 all communicate with each other via the data bus 128. The processor 130 is configurable to access the memory 132 which stores computer code or computer-readable instructions in order for the processor 130 to execute the specialized algorithms. As illustrated in FIG. 1B, memory 132 may comprise some, none, different, or all of the features of memory 120 previously illustrated in FIG. 1A. The algorithms executed by the processor 130 are discussed in further detail below. The receiver 126 as shown in FIG. 1B is configurable to receive input signals 124. The input signals 124 may comprise signals from a plurality of operative units 104 illustrated in FIG. 1A including, but not limited to, sensor data from sensor units 114, user inputs, motor feedback, external communication signals (e.g., from a remote server), and/or any other signal from an operative unit 104 requiring further processing. The receiver 126 communicates these received signals to the processor 130 via the data bus 128. As one skilled in the art would appreciate, the data bus 128 is the means of communication between the different components—receiver, processor, and transmitter—in the processor. The processor 130 executes the algorithms, as discussed below, by accessing specialized computer-readable instructions from the memory 132. Further detailed description as to the processor 130 executing the specialized algorithms in receiving, processing, and transmitting of these signals is discussed above with respect to FIG. 1A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, non-volatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configurable to further communicate the output signals to a plurality of operative units 104 illustrated by signal output 136.

One of ordinary skill in the art would appreciate that the architecture illustrated in FIG. 1B may illustrate an external server architecture configurable to effectuate the control of a robotic apparatus from a remote location, such as server 202 illustrated next in FIG. 2. That is, the server may also include a data bus, a receiver, a transmitter, a processor, and a memory that stores specialized computer-readable instructions thereon.

One of ordinary skill in the art would appreciate that a controller 118 of a robot 102 may include one or more processors 138 and may further include other peripheral devices used for processing information, such as ASICS, DPS, proportional-integral-derivative ("PID") controllers, hardware accelerators (e.g., encryption/decryption hardware), and/or other peripherals (e.g., analog-to-digital converters) described above in FIG. 1A. The other peripheral devices when instantiated in hardware are commonly used within the art to accelerate specific tasks (e.g., multiplication, encryption, etc.) which may alternatively be performed using the system architecture of FIG. 1B. In some instances, peripheral devices are used as a means for intercommunication between the controller 118 and operative units 104 (e.g., digital to analog converters and/or amplifiers for producing actuator signals). Accordingly, as used herein, the controller 118 executing computer-readable instructions to perform a function may include one or more processors 138 thereof executing computer-readable instructions and, in some instances, the use of any hardware peripherals known within the art. Controller 118 may be illustrative of various processors 138 and peripherals integrated into a single circuit die or distributed to various locations of the robot 102 which receive, process, and output information to/from operative units 104 of the robot 102 to effectuate control of the robot 102 in accordance with instructions stored in a memory 120, 132. For example, controller 118 may include a plurality of processors 138 for performing high-level tasks (e.g., planning a route to avoid obstacles) and processors 138 for performing low-level tasks (e.g., producing actuator signals in accordance with the route).

Figure 2A:
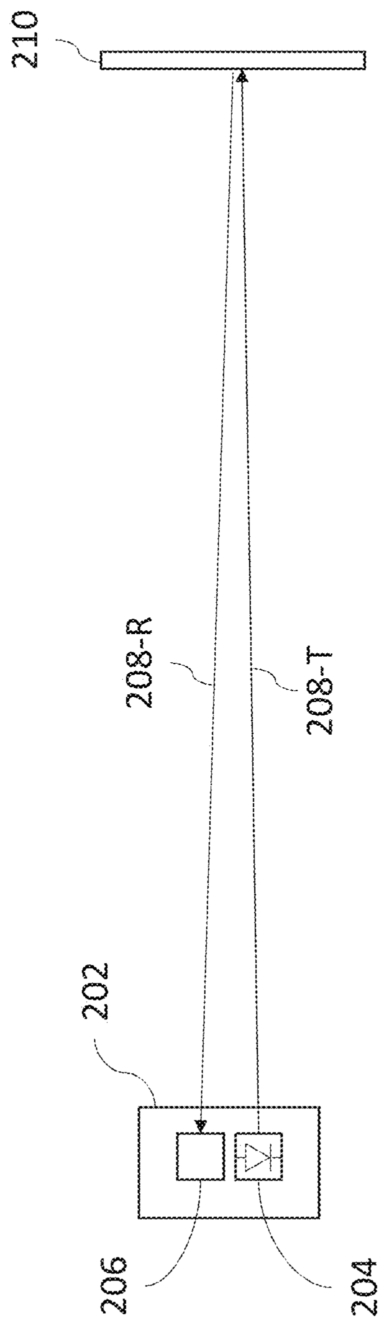
FIG. 2A illustrates a depth camera calculating a distance to a target, according to an exemplary embodiment.

FIG. 2A illustrates a time of flight ("ToF") depth camera 202 to illustrate operation principles of depth cameras, in accordance with some embodiments of the present disclosure. Depth camera 202 may comprise an emitter element 204 and a detector element 206. The emitter 204 may be configured to emit plurality beams 208 of modulated light to illuminate a visual scene. The beams 208 may be emitted at discrete angles across a field of view of the depth camera 202, wherein a single beam 208-T emitted from the depth camera 202 is illustrated. The emitter may comprise a light-emitting diode ("LED"), a vertical cavity surface emitting laser ("VCSEL"), or other light-emitting element, wherein the light emitted is typically within infrared or ultraviolet wavelengths and invisible to humans, however the light may be of any wavelength. The detector 206 may be configured to detect reflected beams 208-R returning to the detector 206 of the sensor 202; a single beam 208-R corresponding to the transmitted beam 208-T is illustrated for clarity, however it is appreciated that the emitter 204 may emit beams 208 across an entire field of view of the depth camera 202 at a plurality of discrete angles. Similarly, the detector 206 may receive a plurality of reflected beams 208-R. The returning beams 208-R correspond to a reflected portion of their corresponding emitted beam 208-T counterpart, each of which reflects off an object 210 and is returned to the sensor 202. The detector 206 may comprise a charged coupled device ("CCD") array or another pixel matrix element configurable to receive a reflected beam 208-R and map the beam 208-R to a pixel of an image plane.

According to at least one non-limiting exemplary embodiment, the depth camera 202 may further include lenses and other hardware elements (not shown) which direct beams 208-T to be emitted from the sensor 202 in a predetermined pattern. The predetermined pattern may include a uniform illumination of a visual scene or an anisotropic emission pattern of beams 208-T, wherein more or fewer beams 208-T may be emitted within certain portions of the field of view.

According to at least one non-limiting exemplary embodiment, the depth camera 202 may further include a processor 138 configurable to read out values from the CCD or pixel matrix element to produce depth images. In other embodiments, a controller 118 of a robot 102 comprising the depth camera 202 may process the CCD or pixel matrix element to produce a depth image.

Depth camera 202 may utilize the emitter 204 to produce a plurality of beams 208-R across its field of view at discrete angles, the discrete angles corresponding to an angular resolution of the depth camera 202. Each beam 208-T emitted from the depth camera 202 may be mapped to a pixel of the image plane of the sensor such that each beam 208-T, upon reflecting off object 210 and being returned to the detector 206, localizes a point in 3-dimensional ("3D") space. The resulting depth measurements for each pixel of the image plane may produce a depth image, where the depth image may include a number of pixels each encoded with a depth or distance measurement and, in some instances, a color value (e.g., greyscale or RGB color). In some embodiments, color values of the depth image correspond to depth values. The beams 208-T emitted from the depth camera 202 may be emitted as pulses or flashes of electromagnetic energy (i.e., photons).

Beams 208 emitted from the depth camera 202 may be amplitude modulated ("AM") and/or frequency modulated ("FM"). Modulation of the emitted beams 208 may enable the depth camera 202 to emit a succeeding pulse or flash of beams 208 prior to a preceding pulse or flash of beams 208 being returned to the detector 206. That is, modulating the amplitude or frequency of the emitted beam 208 may enable the depth camera 202 to identify which pulse or flash a received reflected beam 208-R corresponds to such that accurate ToF calculations may be made. For example, FIG. 2B illustrates a pulse pattern of an AM beam 208, according to an exemplary embodiment.

Figure 2B:
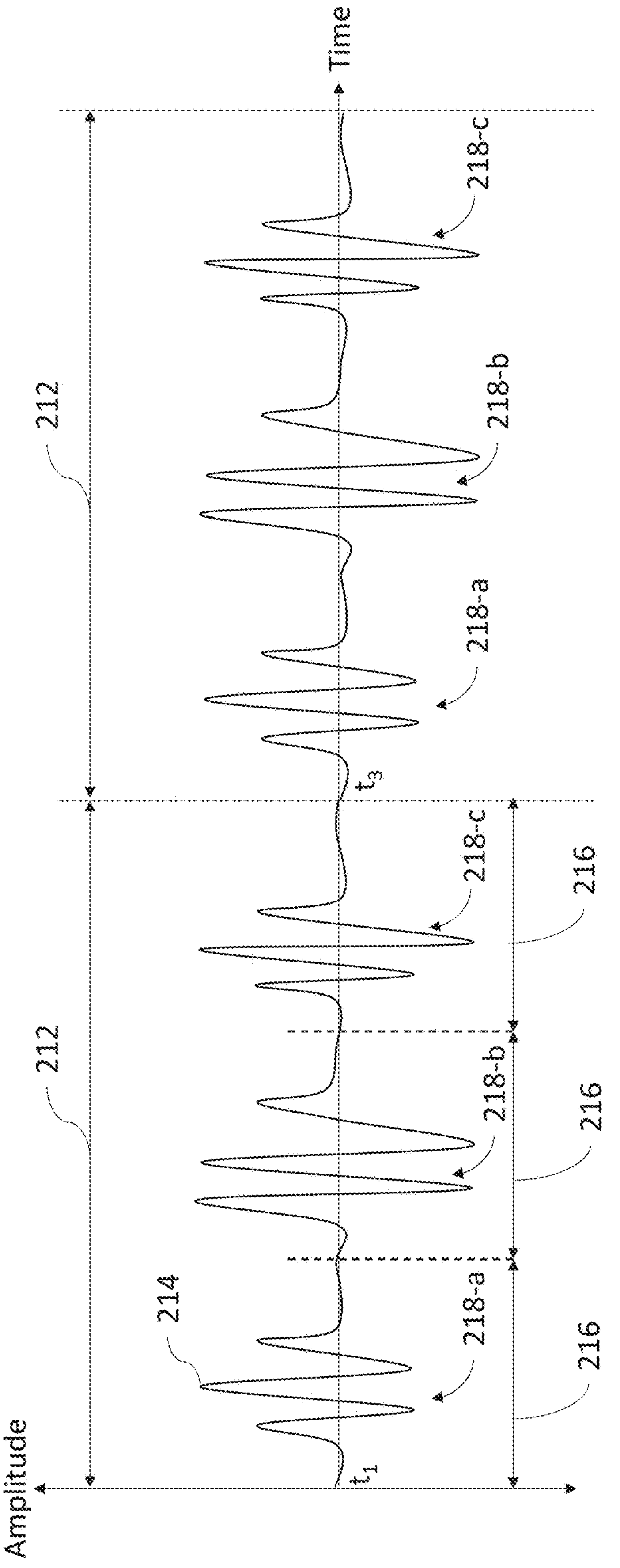
FIG. 2B illustrates an amplitude-modulated pulse-emission pattern of a depth camera, according to an exemplary embodiment.

FIG. 2B illustrates a pulse pattern 214 of a beam 208 emitted from a depth camera 202 over time, according to an exemplary embodiment. Pattern 214 may be a cyclic pattern, comprising a first period 212, wherein the pattern 214 repeats for each first period 212 as shown. The pattern 214 may be amplitude modulated ("AM") and/or frequency modulated ("FM"). Within each first period 212, a plurality of pulses 218, each comprising a second period 216, are emitted from the depth camera 202. Each pulse 218 within a first period 212 may be modulated differently from other pulses 218 of the same first period 212. For example, pulse 218-*a* may be modulated differently than pulse 218-*b* and 218-*c* within the period 212 as shown by the different peaks and troughs, and amplitudes thereof, for each pulse 218-*a*, 218-*b*, and 218-*c*. The different patterns of pulses 218-*a*, 218-*b*, and 218-*c* may be the result of modulating each of the pulses 218-*a*, 218-*b*, and 218-*c* with different frequencies, amplitudes, and/or time durations. Modulating each pulse 218 differently from other pulses 218 within a first period 212 may enable the depth camera 202 to determine, given a return signal, which pulse 218-*a*, 218-*b*, or 218-*c* the return signal correlates to, thereby yielding a ToF or distance measurement. For example, if the detector 206 of the depth camera 202 receives a return signal which includes a pattern similar to pulse 218-*a*, the detector 206 may determine that the return signal corresponds to the emitted pulse 218-*a*, wherein ToF may subsequently be calculated based on the time pulse 218-*a* was emitted and subsequently received. Use of modulated pulses 218 may enable a depth camera 202 to emit a second pulse 218-*b* prior to all beams 208 of the previous first pulse 218-*a* being returned to the detector 206 of the depth camera 202 by enabling the depth camera 202 to correlate a return signal to an emitted signal based on the pattern of the output and received signals. This may enable depth cameras 202 to capture and process distance measurements at increased speed (i.e., emit more pulses 218 per second).

According to at least one non-limiting exemplary embodiment, each pulse 218-*a*, 218-*b*, and 218-*c* may include a different number of peaks or troughs from other periods 218-*a*, 218-*b*, or 218-*c* within a given first period 212. Each pulse 218 shown in FIG. 2B including three maxima and two minima is simplified for illustration of the concept but is not intended to be limiting. In practice, the number of maxima and minima per pulse may range into the thousands. One skilled in the art may appreciate that each pulse 218-*a*, 218-*b*, or 218-*c* may include any number of peaks/troughs based on the amplitudes and/or frequencies used to modulate the beam 208.

According to at least one non-limiting exemplary embodiment, each pulse 218-*a*, 218-*b*, and 218-*c* may comprise a discrete pulse. For example, each pulse 218-*a*, 218-*b*, and 218-*c* may be approximate square wave functions. To distinguish each pulse 218 from other pulses 218 within a same period 212, the square waves may include, for example, different duty cycles, durations, frequencies, and/or amplitudes from other square waves of other pulses 218. For example, pulse 218-*a* may include an approximate square wave pattern with a first amplitude, frequency, and/or duration, pulse 218-*b* may include an approximate square wave pattern with a different amplitude, frequency, and/or duration, and so forth. That is, pulse pattern 214 being a time-continuous emission of electromagnetic energy is not intended to be limiting.

Period 212 may be configured based on the maximum range of the sensor 202 and may last approximately twice the maximum distance divided by the speed of light c. In doing so, all beams 208 comprising a pulse pattern, e.g., 218-*a* emitted from the depth camera 202 reflect off objects within the maximum distance from the depth camera 202 prior to the same pulse pattern 218-*a* of a subsequent period 212 reaching the objects. Typically, beams 208 reflecting off of objects beyond the maximum range may not include sufficient returning power to be detected by the depth camera 202. In some scenarios, however, highly reflective objects beyond the maximum distance illuminated by a pulse pattern 218 of a first period 212 may be illuminated by the same pulse pattern 218 of a subsequent period 212 prior to the pulse pattern 218 of the first period 212 returning to the detector 206, wherein the detector 206 may correlate the returned beam 208-R with the pulse pattern 218 of the second period 212, assume no measurement was collected by the first pulse pattern 218 (i.e., the emitted beam 208 does not reflect off any objects), and thereby produce an inaccurate (underestimated) distance measurement. This is further illustrated in FIGS. 2C and 3 below. Beams 208 impinging on these reflective objects at normal incidence further increases the likelihood that an object beyond the maximum range of the depth camera 202 is sensed, at least in part.

By way of illustration, the first pulse 218-*a* of a first period 212 may leave the emitter 204 at time $t_1$, travel into the environment, reflect off an object, and be received by the detector 206 at a later time $t_2$. The same pulse pattern 218-*a* of a subsequent first period 212 may be emitted at time $t_3$, reflect off the object, and be received by the detector 206 at time $t_4$. Assuming all objects within the field of view are within the maximum range of the sensor, the time sequence may be: $t_1<t_2<t_3<t_4$ (i.e., $t_1$ occurs before $t_2$, and so forth), wherein the distance relates to a ToF of $t_2-t_1$ and $t_4-t_3$. In some instances, if a highly reflective object is beyond the maximum range of the depth camera 202 the timescale may be: $t_1<t_3<t_2<t_4$. That is, the second pulse 218-*a* of the second period 212 is emitted prior to the reflection of the first pulse 218-*a* of the first period 212 being received. In doing so, the detector 206 may determine that (i) the first pulse pattern 218 of the first period 212 was never reflected back to the detector 206 (i.e. a "no measurement" reading), and (ii) incorrectly determine that the same pulse 218-*a* of the second period 212 emitted at $t_3$ was received at time $t_2$ and not $t_4$. Accordingly, the detector 206 may determine that the ToF of the pulse 218 of the second period 212 is equal to $t_2-t_3$, which is incorrect and underestimates the distance to the object. This underestimation causes objects beyond the maximum range of the depth camera 202 to be localized substantially closer to the depth camera 202. Localizing objects close to the depth camera 202 may cause a robot 102 to perceive the object as being closer than it really is, thereby causing stops or interruption in autonomous operation.

It is appreciated that localizing an object beyond the maximum range of the depth camera 202 may not always occur, however a single beam 208 which reflects off the object and is detected by the detector 206 may cause a controller 118 of a robot 102 to localize an object close to the robot 102, thereby causing the robot 102 to stop, slow down, or otherwise interrupt autonomous operation. Typically, the radiant intensity (W/sr) or spectral intensity (W/m/sr) of depth cameras 202 does not change as the maximum range is increased or decreased, rather periods 212 and/or the number of pulses 218 therein may be extended or shortened.

According to at least one non-limiting exemplary embodiment, pulse pattern 214 may be a frequency modulated ("FM") signal. FM signals may comprise emitting beams 208-T from the depth camera 202 which comprise at least two (optical) frequencies. Each pulse 218 of a period 212 may be modulated with a different frequency/frequencies from other pulses 218 within the period 212. Although the present disclosure illustrates and discusses AM patterns 214, one skilled in the art may appreciate that FM patterns 214 and/or both AM and FM patterns 214 may be equally applicable given the contents of the present disclosure.

According to at least one non-limiting exemplary embodiment, the pulse pattern 214 may be frequency modulated using one sinusoid or two or more sinusoids of different frequencies. According to at least one non-limiting exemplary embodiment, the pattern 214 may be modulated using an approximate square wave function, sawtooth function, or approximates thereof. That is, the illustrated pattern 214 is not intended to be limiting.

Typically, depth cameras 202 do not directly measure a ToF of a beam 208, rather the depth cameras 202 may utilize a phase difference between the output waveform and the received waveform to determine distance. Using direct measurement of ToF may require the use of a detector 206 operating at tens or hundreds of giga-hertz, which is either impossible or not economical. Equation 1 relates the frequency f of a sinusoid which modulates pulses of a depth camera 202 to the wavelength λ of the sinusoid:

$$c=\lambda f \quad \text{(Eqn. 1)}$$

where c is the speed of light. Typically, λ and f are predetermined parameters of the depth camera 202, wherein λ0 is a few meters (e.g., 1-20 m) and f is a few (e.g., 1) to hundreds of MHz. The modulation frequency f is chosen such that is greater than a maximum range of the depth camera 202. The wavelength λ corresponds to the wavelength of the modulated sinusoid or AM envelope wavelength, not the wavelength of light emitted by the emitter 204. Unless an object is a distance from the depth camera 202 equal to the wavelength λ, a 180° phase shift may occur upon a beam 208 reflecting off an object.

To measure the phase shift, φ, of the reflected beam 208-R with respect to the emitted beam 208-T, equation 2 may be utilized:

$$\varphi = \arctan\left(\frac{A_1 - A_3}{A_4 - A_5}\right) \quad \text{(Eqn. 2)}$$

where the four $A_n$ values represent samples of the amplitude of the returned beam 208 at four equally spaced points, each corresponding to a separation of 90° (in phase-domain) or λ/4 samples (in time-domain). Further, upon reflection, a 180° phase shift occurs and is accounted for by the detector 206. Distance d to a target object (i.e., half a distance a beam 208 travels) is denoted by equation 3:

$$d = \frac{c\varphi}{4\pi f} \quad \text{(Eqn. 3)}$$

where φ is measured in radians, c is the speed of light, and f is the modulation frequency. By way of illustration, for distances d of 15 m (maximum), the operational frequency of the detector 206 may be 80 MHz (i.e., 4 times the modulation frequency corresponding to the detector 206 collecting four samples $A_1$-$A_4$ per λ).

One skilled in the art may appreciate other various ways of reducing the operational frequency of the detector 206 and, in some instances, emitter 204, none of which are intended to be limiting.

Figure 2C:
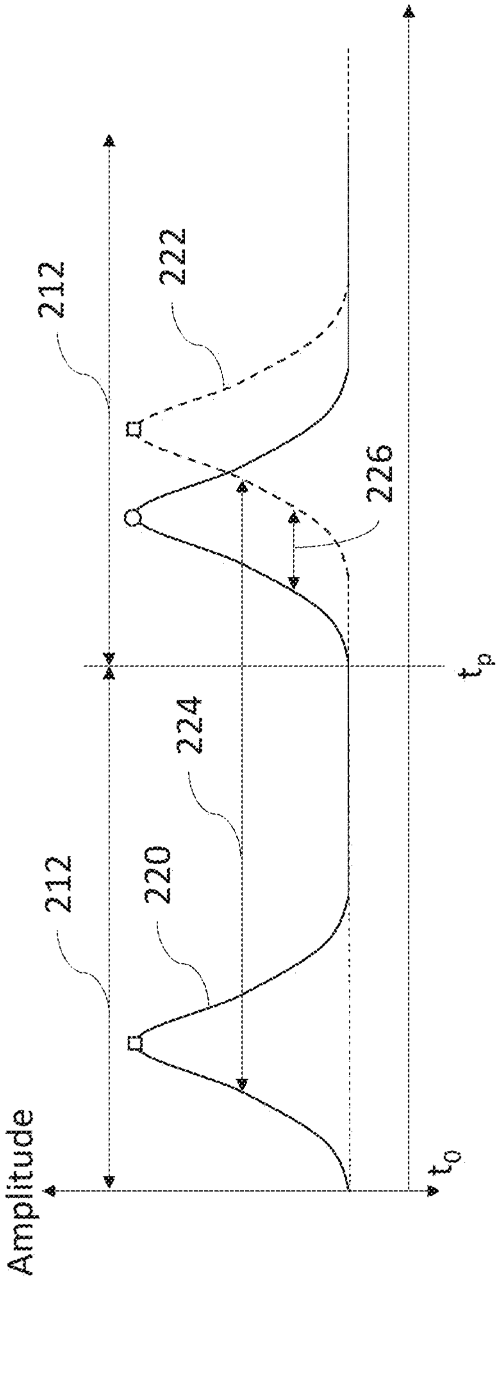
FIG. 2C illustrates how a pulse-modulated time of flight sensor may underestimate a distance measurement, according to an exemplary embodiment.

To illustrate how periodic AM/FM signals may cause incorrect localization of objects, FIG. 2C will be discussed next. FIG. 2C illustrates an exemplary output modulated waveform 220 output from an emitter 204 of a depth camera 202 and a corresponding received waveform 222 detected by a detector 206 of the depth camera 202, according to an exemplary embodiment. The modulation of the waveform 220 has been simplified for clarity to comprise a single peak (e.g., an envelope); however one skilled in the art may appreciate other waveforms modulated with one or more sinusoids or pulses may be utilized. The graph of FIG. 2C is intended to illustrate an exemplary scenario wherein a distance to an object beyond the maximum range of the depth camera 202 is substantially underestimated.

The depth camera 202 may output a first pulse pattern at time $t_0$. After a period of time denoted by period 212, the depth camera 202 may output a second pulse pattern identical to the first at time $t_p$. The depth camera 202 may output other pulses between $t_0$ and $t_p$ which have been omitted for clarity as the depth camera 202 is able to differentiate different pulses from each other within a single period 212 due to the AM or FM. It is expected that, assuming all objects are within the maximum range of the depth camera 202, the return signal 222 would include a spike identical to the first pulse pattern of the output waveform 220 sometime between $t_0$ and $t_p$ based on the distance to the object. However, due to no object being present within the maximum range of the depth camera 202, the returning spike of waveform 222 may not be detected until after time $t_p$ and after emission of the second spike of the output waveform 220. This is illustrated by a denotation of the spikes of the output waveform 220 using shapes, wherein the spike of the returning waveform 222 includes a square which corresponds to the first spike of the output waveform 220 at to and not the second spike at $t_p$ shown using a circle. That is, the illustrated spike of the return signal waveform 222 corresponds to a reflected beam 208 emitted during the first spike of waveform 220 (both denoted with squares). It is appreciated, however, that due to the periodicity of the AM or FM output waveform 220, the depth camera 202 is not able to differentiate to which period 212 the received spike of waveform 222 corresponds (i.e., the circle or square spike). Although not illustrated, the returning signal 222 may include a smaller amplitude than the emitted signal due to scattering, diffusion, and/or energy loss from diffuse reflection on a surface of an object.

Due to the periodicity of the AM or FM output waveform 220, the depth camera 202 may determine that the phase difference between the return signal 222 and the output waveform 220 corresponds to the phase shown by arrows 226, wherein it may be assumed the first waveform 220 was never reflected to the sensor. The true phase difference is shown by arrows 224 which is substantially larger than arrow 226, corresponding to a larger phase difference and therefore a larger ToF. The smaller phase difference may cause the depth camera 202 to produce a depth reading substantially smaller than the true depth to the object, which may cause a robot 102 to perceive an object substantially close to the robot when the object is actually beyond the maximum range of the depth camera 202.

The prior discussion relating to equations 1-3 and FIG. 2A-B are intended to illustrate how AM or FM pulse patterns 214 operate and provide background as to why AM or FM signals are used in depth cameras 202. The advantages are commonly recognized within the art and have been implemented in many conventional depth cameras. These advantages, however, introduce drawbacks in that localizing objects beyond the maximum range d of the depth camera 202 may be influenced by the periodicity of the modulation frequency f, especially in environments comprising highly reflective objects which may be detected beyond a maximum range of the depth camera 202.

Discussed below are novel systems and methods for removing incorrectly localized objects in depth imagery due to the periodicity of the modulation frequency and pulse pattern 214 to improve robotic navigation.

Figure 3:
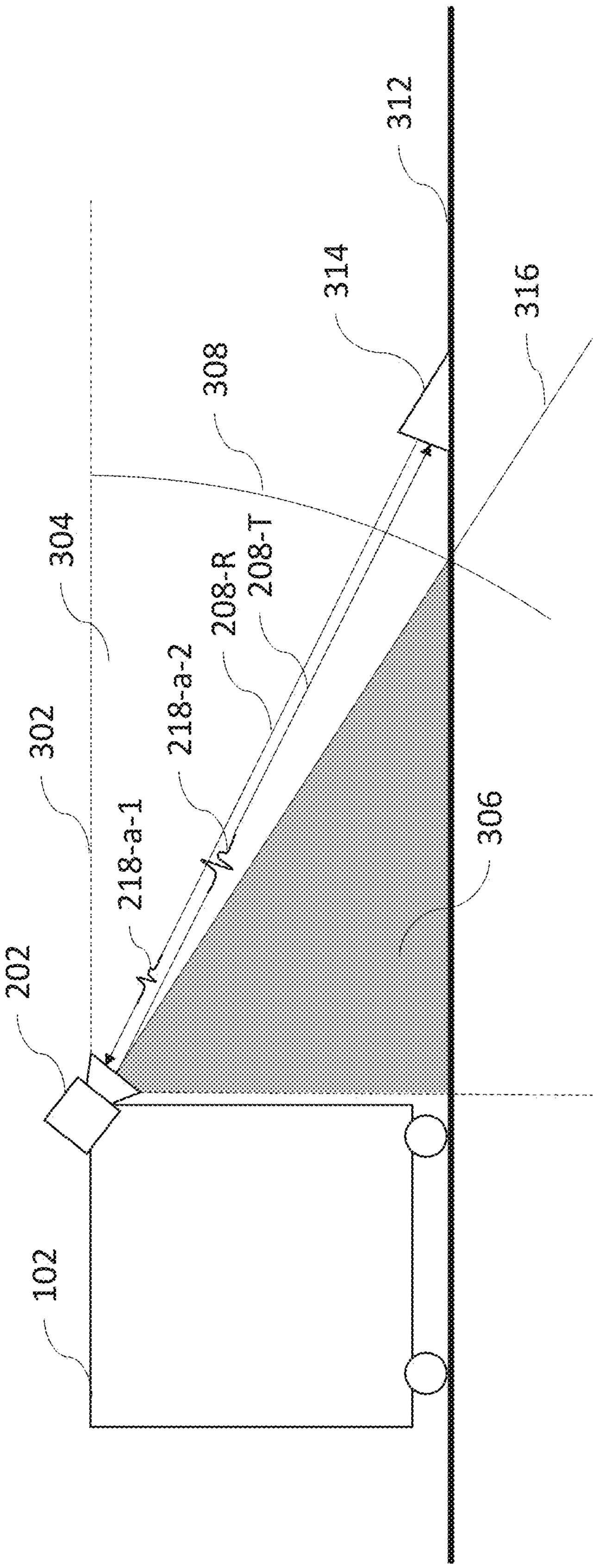
FIG. 3 illustrates a robot using a pulse-modulated time of flight sensor to navigate upon a floor, according to an exemplary embodiment.

FIG. 3 illustrates a robot 102 navigating upon a floor 312, according to an exemplary embodiment. The sensor units 114 of the robot 102 may include one or more depth cameras 202—one has been illustrated. The illustrated depth camera 202 may include a field of view denoted by field of view lines 302 (dashed), wherein the field of view captures, in part, the floor 312 ahead, behind, or surrounding the robot 102. The depth camera 202 may comprise a maximum range denoted by arc 308. The maximum range may be based on period 212 of an AM or FM pulse pattern 214 such that the period 212 multiplied by the speed of light is approximately twice the maximum range denoted by arc 308.

The field of view may comprise two regions 304, 306. Both regions 304, 306 are defined by an angular range within the field of view of the depth camera 202. Region 304 (white) may comprise a region wherein, absent any objects (e.g., 210, 314), the depth camera 202 does not typically receive any returning beams 208 as the floor 312 is outside the maximum range of the depth camera 202 shown by arc 308. Region 304 includes portions of the field of view 302 which are above the intersection between the floor 312 and arc 308, or above a horizon. Region 306 may comprise a region of the field of view wherein the floor 312 is within the maximum range of the depth camera 202 such that the depth camera 202 almost always captures distance measurements (i.e., returning beams 208-R). That is, beams 208 of the second region 306 may persistently or almost always measure distances to an object, such as floor 312, whereas the first region 304 may typically measure distances to objects only if the objects are within the maximum range denoted by arc 308. Region 306 may be referred to herein as a persistent region. In some instances, objects within the portion 304 of the field of view and beyond the maximum range may still be detected by one or more beams 208, although these objects are detected less consistently than objects within the maximum range (e.g., not detected within every depth image, only detected in part, etc.). For example, the object 314 may be substantially reflective such that the reflected beam 208-R includes sufficient power to be detected upon returning to the depth camera 202. That is, maximum range 308 does not denote the physical maximum distance traveled by beams 208 which are detectable by a detector 206 of the depth camera, rather the maximum distance may correspond with periods 212 of the pulse pattern 214. Although beams 208-T and 208-R are illustrated as continuous lines, one skilled in the art may appreciate that the beams 208 may comprise a plurality of discrete pulses 218, wherein the illustration of the beams 208 as continuous lines is to illustrate the path traveled by the beams 208 and their pulses 218.

The maximum distance, or duration of period 212, may be configured for a depth camera 202 based on a plurality of factors apparent to one skilled in the art. In some instances, the power of beams 208 may be limited due to hardware and/or safety reasons. In some instances, the maximum range is further limited by environmental factors such as scattering and diffusion. In some instances, the maximum range may be configured based on the resolution of the depth camera 202. In some instances, the maximum range may be tunable, wherein the maximum and minimum values of the range are configured based on these considerations (e.g., beam 208 power, resolution, safety, diffusion, etc.).

Object 314 may lie within the angular range of region 304 of the field of view and beyond the distance of arc 308 from the depth camera 202. In some instances, beams 208-T may reflect off the object 314 to produce a reflected beam 208-R of enough strength or power such that a return signal is received by the detector 206 of the depth camera 202. It is appreciated that not all beams 208-T incident upon the object 314 are reflected with enough strength or power to be detected by the detector 206. Due to the periodicity of beams 208 (i.e., beams 208 comprise pulses 218, each pulse comprising a unique pulse pattern 214, and the pulse patterns 214 repeat for each period 212), the depth camera 202 may underestimate the distance to the object 314. This underestimation is shown by two pulses 218-*a*-1 and 218-*a*-2 being emitted during two sequential periods 212. The letter suffix (e.g., "-a") denotes the pulse pattern 214 of a given pulse 218 and the numerical suffix (e.g., "-1") denotes the period 212 of which the given pulse 218 is emitted. That is, the pulses 218-*a*-1 and 218-*a*-2 may comprise a same pulse pattern 214 (i.e., the same amplitude modulation and/or frequency/frequencies modulation) emitted during subsequent periods 212. The depth camera 202 may emit the first pulse 218-*a*-1 of the reflected beam 208-R at time $t_1$ during a first period 212 and, prior to the first pulse 218-*a*-1 being returned to the depth camera 202, the depth camera 202 may emit the second pulse 218-*a*-2 at time $t_2$ during a second period 212 which is subsequent to the first period 212. The first pulse 218-*a*-1 may be returned to the detector 206 at time $t_3$ which is after time $t_2$. The depth camera 202 may determine the time of flight of the first pulse 218-*a*-1 to be $t_3-t_2$ instead of $t_3-t_1$ which causes an underestimation of a distance to the object 314, as shown next in FIG. 4A.

Figure 4B:
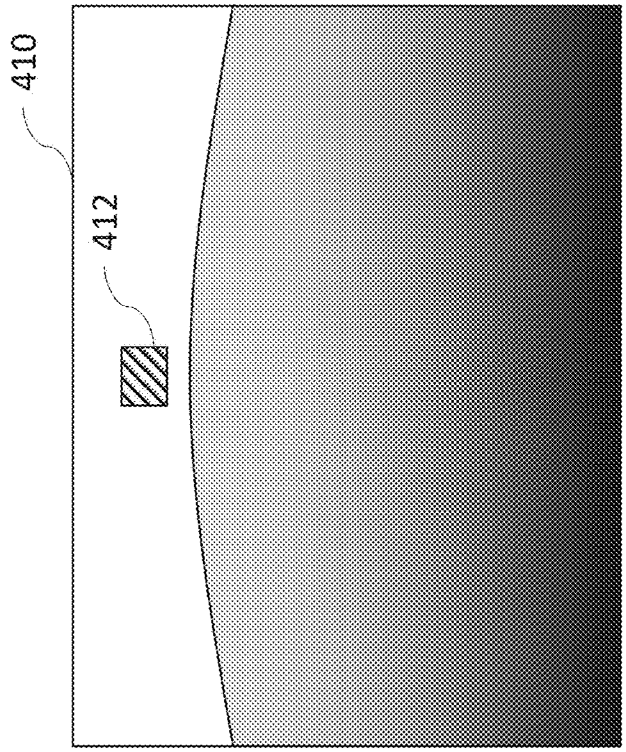
FIGS. 4A-4B illustrate a depth image according to an exemplary embodiment.
Figure 4A:
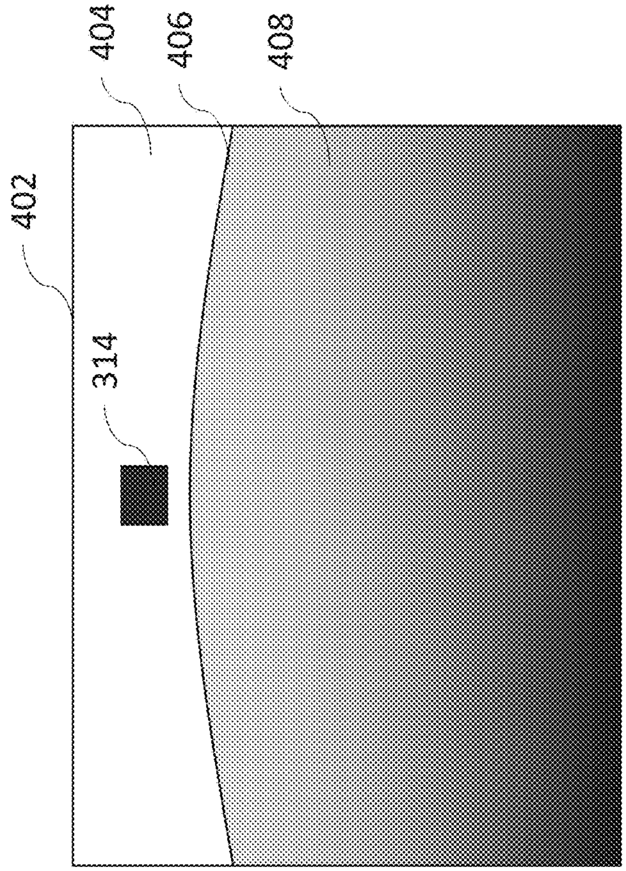

FIG. 4A illustrates a depth image 402 produced by the depth camera 202 illustrated in FIG. 3 above, according to an exemplary embodiment. The depth image 402 may comprise a plurality of pixels, each pixel being encoded using a greyscale value to denote distance, wherein dark pixels represent close or small distances, light grey pixels represent farther or larger distances, and white pixels denote a "no measurement" corresponding to beams 208 for the white pixels not being returned or detected by the detector 206. The white region 404 may correspond to regions wherein, absent any objects, no measurements are taken due to no objects being within the maximum range of the depth camera 202 to reflect the beams 208-R back to the detector 206, as shown from a different perspective as region 304 in FIG. 3 above. Beams 208 may not be returned to the detector 206 and/or may not be detected by the detector 206 if the objects of which the beams 208 reflect off of are substantially far from the depth camera 202. In some instances, however, reflective objects beyond the maximum range of the depth camera 202 may be detected, especially when beams 208 are incident on the object surface at a normal angle. Reflective objects may cause reflected beams 208 to comprise sufficient power to reach threshold detection by detector 206. Region 408 may correspond to a portion of a field of view of the depth camera 202 wherein objects, such as floor 312, are almost always detected, as shown from a different perspective as region 306 in FIG. 3 above. The two regions 404, 408 are separated by a horizon 406, wherein the horizon 406 corresponds to the intersection between the floor 312 and the a rc 308 which denotes the maximum range of the depth camera 202. Each pixel of the image 402 may correspond to a depth measurement produced by a beam 208.

As shown in the depth image 402, the object 314 is represented by dark pixels corresponding to the object 314 being perceived as substantially close to the depth camera 202 and thereby substantially close to the robot 102 due to the phenomenon discussed in FIGS. 2-3 above. It may be advantageous to filter or remove these pixels representing object 314 from the depth image 402 prior to utilizing the depth image 402 for navigation and/or mapping, the filtering being described next in FIG. 4B. One skilled in the art may appreciate that an object 314 detected beyond the maximum range of the depth camera 202 may not always be fully depicted as shown in FIG. 4A-B, wherein depicting the object 314 fully is for illustrative clarity. A more realistic depth image of a similar environmental scenario is shown and described in FIG. 9 below wherein objects, such as object 314, detected beyond the maximum range are only partially detected by only a portion of beams 208 which are incident on the objects.

FIG. 4B illustrates a filtered depth image 410, according to an exemplary embodiment. The filtered depth image 410 may be produced in accordance with methods 500 and 700 described below. The filtered image 410 may comprise a region 412 which, prior to the filtering, represented the object 314. After filtering, the distance measurements of pixels of region 412 may be set to "no measurement" values. Upon filtering the depth image 402 to produce the filtered depth image 410, the controller 118 of the robot 102 may utilize the filtered depth image 410 for navigation (e.g., to produce a computer-readable map of its environment, wherein the map does not include the object 314). For example, the controller 118 may continue to navigate towards the object 314 until the object 314 is detected at or below the maximum range of the depth camera 202, wherein the object 314 will not be filtered from depth images in accordance with methods 500 and 700 discussed below.

It is appreciated that based on the configuration of the depth camera 202 illustrated in FIG. 3, a portion 306 of the field of view may almost always detect objects within the maximum range of the depth camera 202, such as the floor 312. This region 306 of the field of view corresponds to pixels of the region 408 (grey-black region) of the resulting depth image 402 (i.e., below a horizon line). The remaining portion 304 of the field of view may correspond to the region 404 of white pixels of the resulting depth image 402, wherein the portion 404 may typically not receive any returning beams 208-R unless objects are present within the maximum range of the depth camera 202 (i.e., above a horizon line). However, in some instances a returning beam 208-R may be detected for one or more pixels of the depth image 402 within region 404 and may cause an underestimation of distance if the returning beam 208-R travels a distance more than the maximum range of the depth camera 202. Accordingly, underestimated distance measurements may only occur within the portion 404 of the field of view.

Detection of objects within the portion 404 may not always occur, but if it occurs for at least one pixel of one depth image, the one depth image may cause the robot 102 to stop based on an object being detected (falsely) substantially close to the robot 102.

It is appreciated that the specific configuration of depth camera 202 illustrated in FIG. 3 is not intended to be limiting. In some embodiments, the entire field of view of the depth camera 202 may include a region which does not consistently detect objects (e.g., floor 312) within the maximum range of the depth camera 202. For example, a robot could have a camera with a narrow FOV positioned forward-facing on a robot such that it doesn't see the floor. In some embodiments, the resulting depth image 402 may include more or fewer pixels of regions 404, 408. Other exemplary embodiments of robots 102 utilizing depth cameras 202 are illustrated in FIG. 8A-D below.

Figure 5:
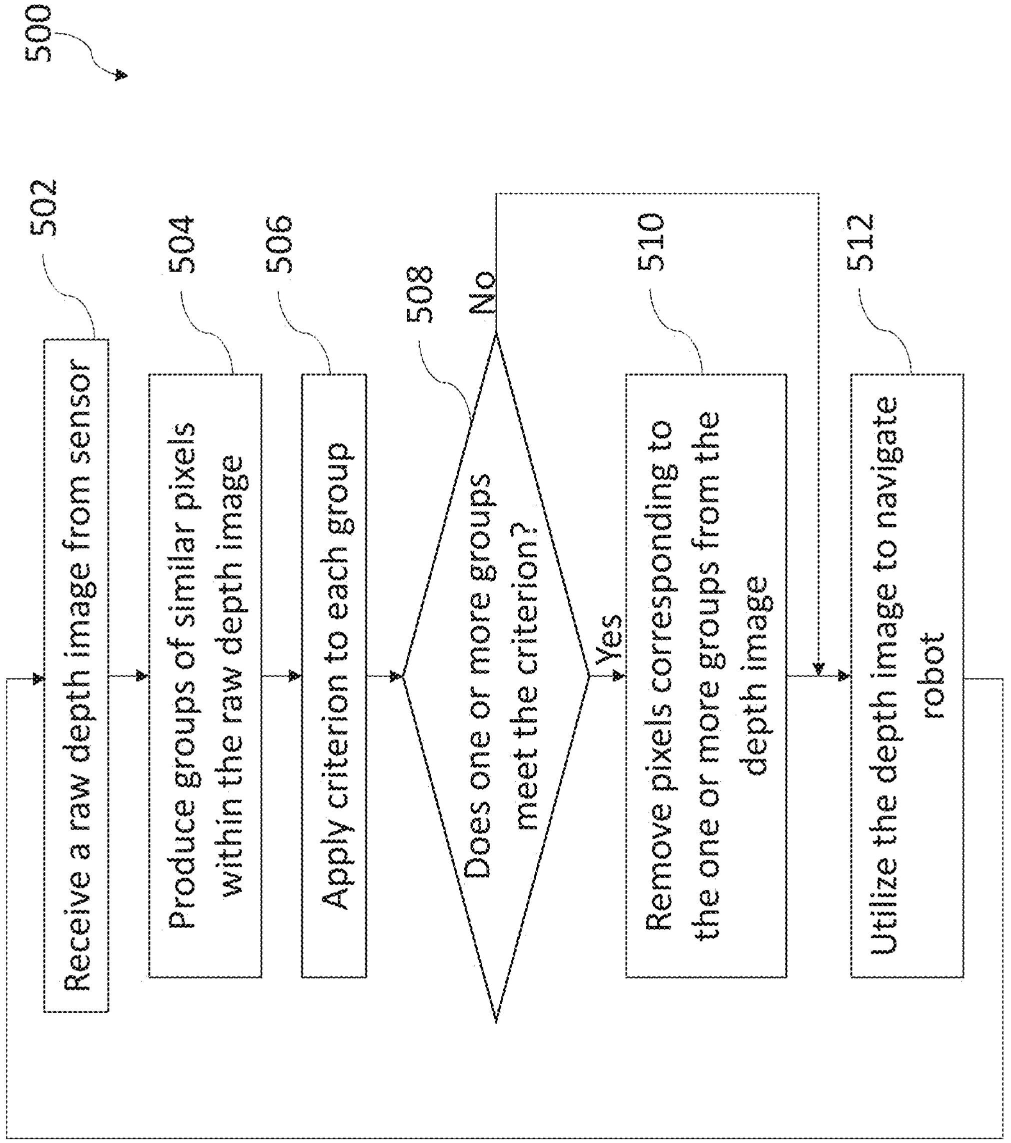
FIG. 5 is a process-flow diagram illustrating a method for a robot to utilize depth imagery to navigate, according to an exemplary embodiment.

FIG. 5 is a process flow diagram illustrating a method 500 for a controller 118 of a robot 102 to utilize images from a depth camera 202 for navigation and filter incorrectly localized objects within the depth images, according to an exemplary embodiment. Steps of method 500 may be effectuated by the controller 118 executing computer-readable instructions stored on memory 120, as appreciated by one skilled in the art.

Block 502 includes the controller 118 receiving a raw, or unprocessed/unfiltered, depth image from a depth camera 202 sensor. The raw depth image may include a plurality of pixels, each pixel being encoded with a depth or distance value and, in some instances, color value(s). The raw depth image corresponds to depth measurements from the depth camera 202 produced subsequent to emission of a pulse 218 of light from the emitter 204. The plurality of depth measurements will be checked for errors following method 500.

Block 504 includes the controller 118 producing groups of similar pixels within the raw depth image to produce a segmented depth image. The controller 118 may group pixels together which may represent an object, similar color values, similar locations within the raw depth image, and/or similar distance measurements. Other contemporary segmentation methods are considered without limitation such as, e.g., contour detection, sematic segmentation using convolutional neural networks, and so forth.

Figure 6B:
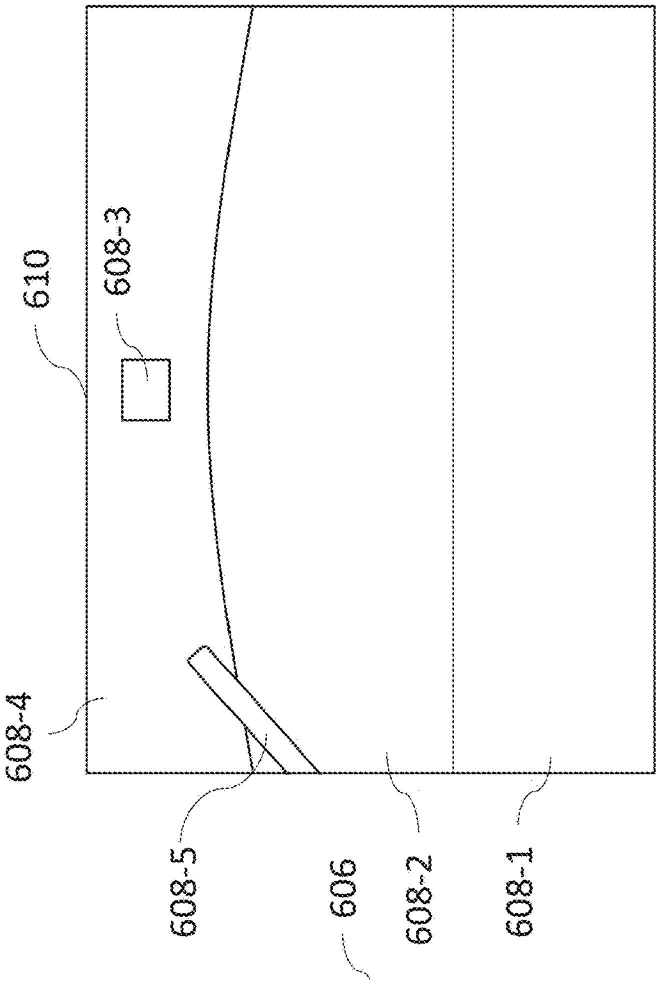
FIG. 6A-B illustrate a grouping of pixels for an input-depth image, according to an exemplary embodiment.
Figure 6A:
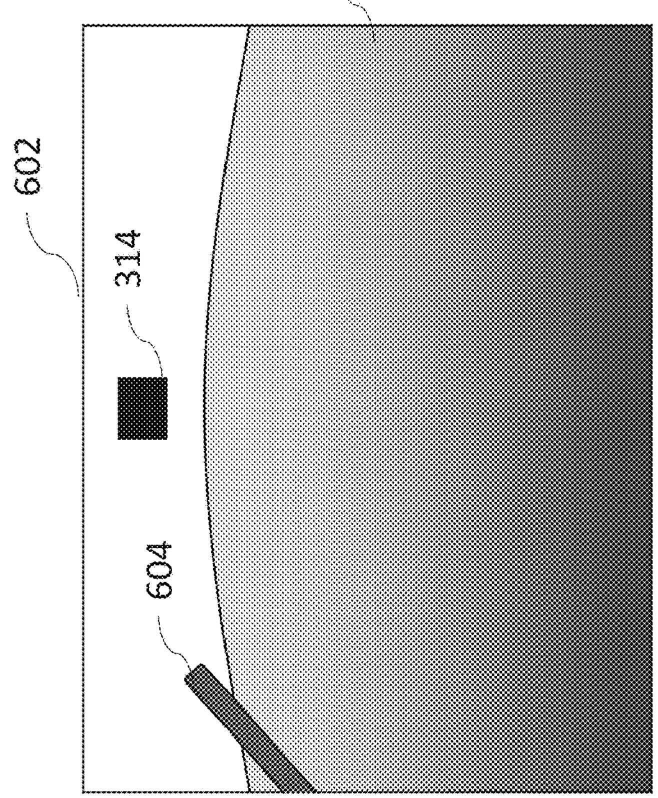

For example, FIG. 6A illustrates a raw depth image captured by a depth camera 202 and FIG. 6B illustrates a grouping of pixels, according to an exemplary embodiment. First, in FIG. 6A, the raw depth image 602 may include a depiction of a visual scene encoded with distance measurements from beams 208. Black pixels denote smaller/shorter distance measurements, grey pixels denote larger distance measurements, and white pixels denote no measurements (i.e., no return beam 208-R is detected). The visual scene may include a floor surrounding the robot 102, denoted by region 606 (e.g., corresponding to portion 306 of a field of view illustrated in FIG. 3A), an object 314 incorrectly localized substantially close to the robot 102, and an object 604 protruding from a side of the raw depth image 602. Object 604 may comprise, for example, a broomstick, a hanging item (e.g., lights), or a portion of a larger object which is only partially depicted.

As shown in FIG. 6B, a controller 118 of a robot 102 may produce groups 608 of pixels of the raw depth image 602 which are similar to each other (e.g., in color, distance values, proximity, or other parameters) to produce a segmented depth image 610 in which the groups 608 may be associated with one or more objects within the visual scene. For example, groups 608 may be formed by a group of pixels when the pixels comprise roughly the same distance measurements (e.g., within 15% of each other). Groups 608 may also be formed by pixels of similar color values, as another example. In some embodiments, similar groups of pixels may be determined based on a clustering analysis, sematic image segmentation, or other known methods within the art.

In the segmented depth image 610 shown in FIG. 6B, the controller 118 may produce five (5) groups 608, according to an exemplary embodiment. Group 608-1 may include pixels of region 608 which are substantially close to the depth camera 202 and robot 102, group 608-2 may include the floor pixels which are a medium distance from the depth camera 202 and robot 102, group 608-3 may denote object 314, group 608-4 may include pixels which have no distance measurements (white pixels in the raw depth image 602), and group 608-5 may represent object 604. Depiction of each of the regions 608 as a white area does not indicate that the segmented depth image has removed distance information, and is solely for simplicity of illustration. It is appreciated that the grouping of pixels may be the same or different in other instances and/or may include more or fewer groups 608, wherein the groups 608 illustrated are purely exemplary. The groups 608 may be determined by the controller 118 utilizing computer vision and image segmentation algorithms, such as, without limitation, connected confidence, cluster analysis, sematic segmentation, convolutional neural network models, and the like.

Returning to FIG. 5, block 506 includes the controller 118 applying a set of criteria for each group 608 of the segmented depth image produced in block 504. The application of the criteria is further illustrated below in FIG. 7. Groups 608 which meet the criteria are filtered from the segmented depth image in blocks 508-510. In short, the criteria for filtering or removing of a group 608 from the segmented depth image may include: (i) the group 608 should not touch a boundary or edge of the depth image; (ii) the groups should comprise an aspect ratio within specified boundaries; and (iii) the group must be detected, in part, within a specified portion of the field of view or specified portion of the depth image. The specified portion may correspond to pixels above a horizon line (e.g., 406/716) of the visual scene or pixels which, absent any objects, measure distances beyond the maximum distance of the depth camera 202 (e.g., region 404 of FIG. 4A, region 714 of FIG. 7B, and region 812 in FIG. 8B and FIG. 8D).

Block 508 includes the controller 118 determining if any one or more groups 608 meet the applied criteria. Upon the controller 118 determining one or more groups 608 which meet the criteria, the controller 118 moves to block 510. Upon the controller 118 determining all groups 608 do not meet the criteria, the controller 118 moves to block 512.

Block 510 includes the controller 118 removing or filtering pixels corresponding to the one or more groups 608 which meet the applied criteria from the depth image. The filtering may include, for example, replacing depth measurements of the group 608 of pixels with a "no measurement" value or the controller 118 not utilizing the depth measurements of the group 608 for producing a computer-readable map of its environment. That is, during navigation and/or mapping using the depth image the controller 118 filters, removes, or otherwise ignores distance measurements corresponding to pixels of the one or more groups 608 which meet the criteria. Once the groups 608 which meet the applied criterion are removed or filtered, the controller 118 may produce a processed depth image. The processed depth image may include one or more filtered regions. An exemplary processed depth image is shown by depth image 410 including a filtered region 412 corresponding to an incorrectly localized object 314 being removed.

Block 512 includes the controller 118 utilizing the processed depth image to navigate the robot 102. The processed depth image utilized may include one, none, or several groups 608 which have been removed, filtered, or otherwise ignored during the navigation/mapping using the depth image. The controller 118 may utilize depth values of the processed depth image to, inter alia, produce a computer-readable map of its environment, navigate around detected obstacles, and/or perform one or more autonomous tasks. The controller 118 may subsequently return to block 502, receive a new raw depth image, and repeat method 500 for every depth image received from the depth camera 202.

Figure 7A:
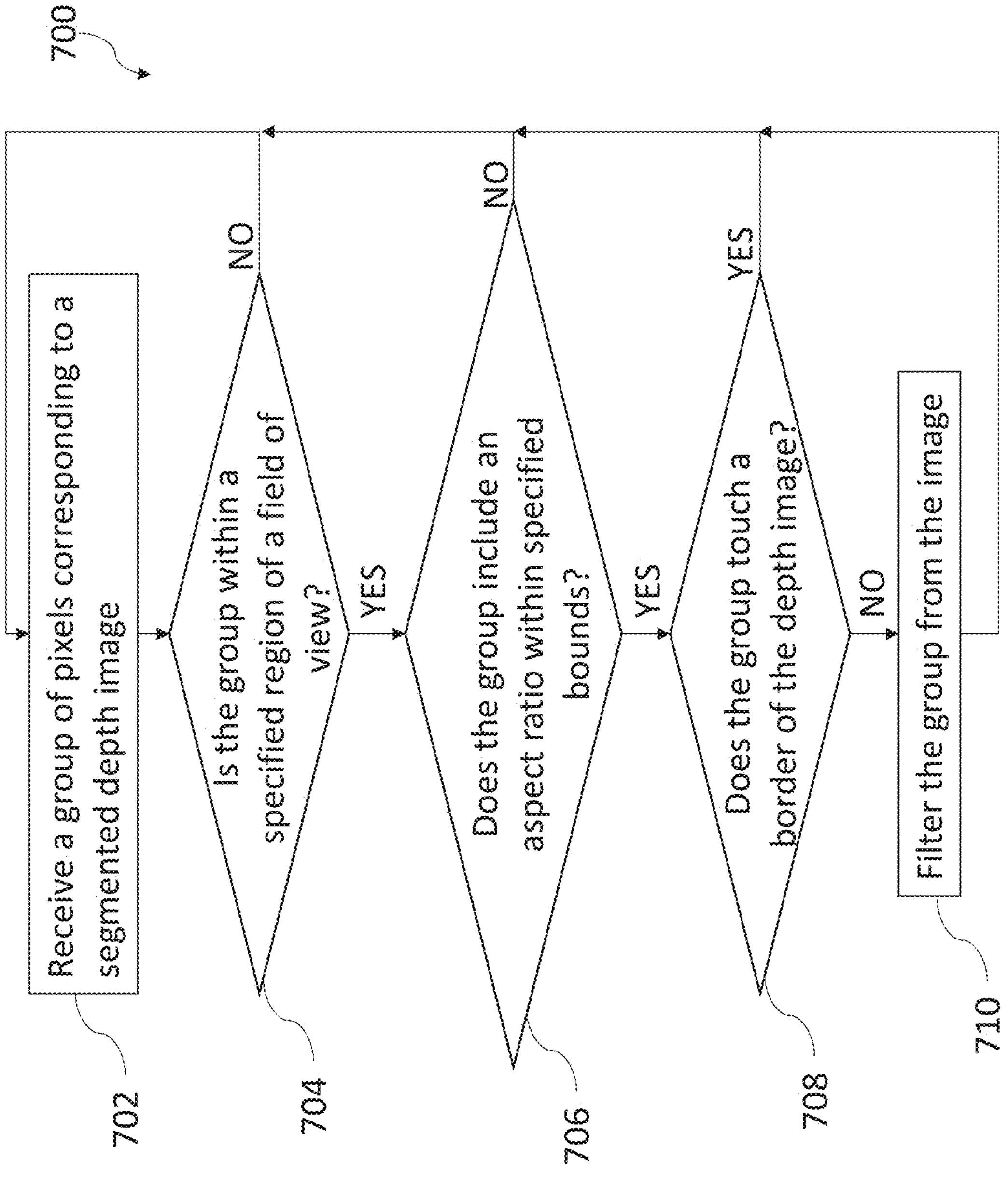
FIG. 7A illustrates three criteria for filtering a group of pixels from a depth image, according to an exemplary embodiment.

FIG. 7A is a process flow diagram illustrating a method 700 for a controller 118 to apply criteria for groups 608 of pixels of a segmented depth image, according to an exemplary embodiment. Method 700 may be illustrative of the steps 506-510 of method 500. Steps of method 700 may be effectuated by the controller 118 executing computer-readable instructions from memory 120, as appreciated by one skilled in the art.

Block 702 includes the controller 118 receiving a group 608 of pixels of a segmented depth image 602.

Block 704 includes the controller 118 determining if the group 608 of pixels is within a specified region of the field of view. Generally, the specified portion includes the pixels of the segmented depth image which correspond to a field of view of the depth camera 202 which does not consistently detect objects, such as pixels of depth images above a horizon line.

Figure 7B:
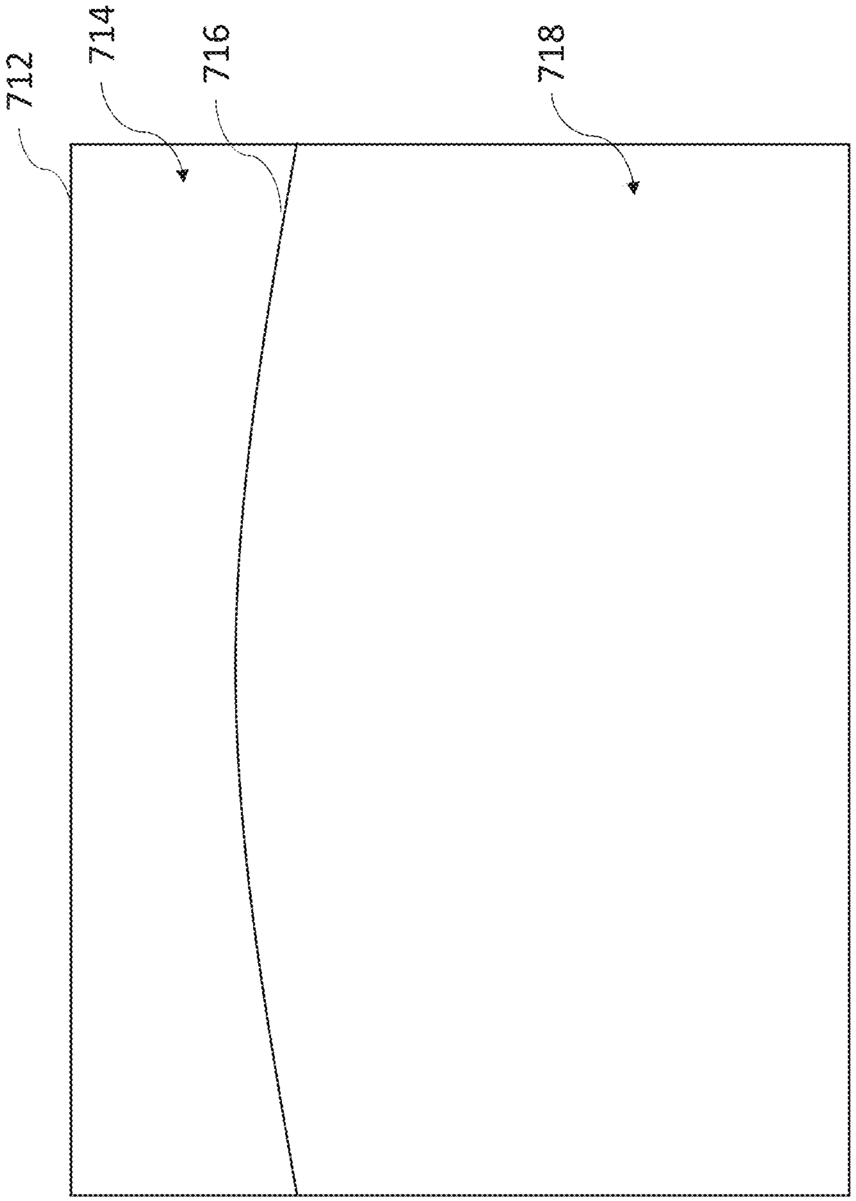
FIG. 7B illustrates a depth image comprising a region wherein objects may be incorrectly localized, according to an exemplary embodiment.

For example, to illustrate how to determine which portion of the field of view of a depth camera represents the specified portion, FIG. 7B illustrates a raw or segmented depth image 712 captured by a depth camera 202 of a robot 102, such as in the configuration depicted in FIG. 3 absent any objects nearby, according to an exemplary embodiment. The depth image 712 may include a first region 714 and a second region 718 corresponding to portions 304 and 306, respectively, of a field of view of the depth camera 202. The two regions 714, 718 are separated by a horizon line 716. The horizon line 716 is illustrated in FIG. 3 as the intersection between the rightmost (i.e., furthest from the robot 102) corner of portion 306 of the field of view and arc 308. The rightmost corner of portion 306 is defined by a line 316 which extends radially from the depth camera and intersects the floor 312. Stated differently, region 714 may correspond to pixels of the depth image 712 wherein, absent any nearby objects, the depth camera 202 produces almost no measurements due to no return beams 208-R being detected (i.e., objects being out of range). Region 718 may correspond to pixels of the depth image 712 wherein distance measurements are almost always received, absent any sensor error or environmental obstacles, such as a large, sharp cliff in floor 312. Incorrect localization of objects beyond a maximum range of the depth camera 202 may occur within region 714, as shown in FIGS. 3-4A. Accordingly, region 714 may correspond to the "specified region" in block 704.

It is appreciated that the configuration of robot 102 and depth camera 202 depicted in FIG. 3 and resulting depth image 712 is intended to be exemplary and non-limiting. Depending on the angle at which the depth camera 202 is oriented, the regions 714, 718 may comprise a larger or smaller portion of the depth image 712. In some embodiments, robots 102 may operate on walls or ceilings (e.g., window cleaning robots), wherein the region 718 may correspond to portions of the field of view of the depth camera 202 which measure distance to the walls or ceilings and portion 714 within the maximum range of the camera, wherein region 714 may comprise the remaining portion of the depth image 712. In some embodiments, depth cameras 202 may be configured to include a field of view which captures, in part, a portion of the robot 102 chassis or body within the maximum measurable range, wherein region 718 may correspond to pixels which depict the robot 102 chassis or body and regions 714 may correspond to the remaining pixels. In some embodiments, multiple separate regions 714, 718 may exist. For example, robots 102 may operate in hallways, wherein regions 718 may correspond to a floor and side walls of the hallway (and in some instances the ceiling), wherein region 714 may correspond to the remaining pixels (e.g., looking down the hallway where no objects exist within the measurable range). In some embodiments, the specified region may correspond to the entire depth image. One skilled in the art may appreciate that there exists a plurality of different configurations of depth cameras 202 for robotic devices, wherein a portion 718 of the depth images produced may almost always return distance measurements and a portion 714 may almost always return no measurements. If the depth camera 202 remains in a fixed or static position, the pixels of the image 712 may correspond to the same region 714 or 718 over time. Additional exemplary embodiments of regions 714, 718 are illustrated below in FIG. 8A-D as regions 812, 810, respectively.

Returning to block 704 of FIG. 7A, if the group 608 of pixels received in block 702 is located, at least in part, within the specified region (e.g., region 404 of FIG. 4A, region 714 of FIG. 7B, etc.), the controller 118 may move to block 706. If the group 608 is not at least in part within the specified region (e.g., the group 608 is entirely within region 718), the controller 118 does not filter the group 608 and may return to block 702. Advantageously, by specifying a predetermined region within the field of view to search for erroneous distance measurements may reduce the cycle time required for the controller 118 to execute methods 500 and 700 for each image captured by reducing the area/pixels to be searched for erroneous measurements.

Block 706 includes the controller 118 determining if the group 608 includes an aspect ratio within specified bounds. There are at least three considerations when selecting the bounds of the aspect ratio. First, objects beyond the maximum range of a depth camera 202 which are detected are typically only partially localized incorrectly. That is, only some beams 208 which reflect off of the objects (e.g., 314) are returned to the detector 206 while the remaining beams 208 either do not comprise sufficient power to be detected or are reflected away from the detector 206, causing incorrectly localized objects to only be partially represented in resulting depth imagery. Typically, incorrect localization due to the phenomenon discussed in FIG. 2-3 above results in small groupings of pixels which include incorrect and underestimated distance measurements; these pixels often represent beams 208 which are of normal incidence to a reflective surface of the object. Second, it may be dangerous in some robotic applications to filter out too much data from depth imagery. In some embodiments, robot 102 may be operating in dynamic and rapidly changing environments, wherein filtering a substantial number of pixels from depth imagery may pose a safety risk. Third, the resolution of the depth camera may be considered. One skilled in the art may appreciate that the specific numerical value for the bound of the aspect ratio may depend on the resolution of the depth camera. For example, the aspect ratio may include an upper bound equal to 0.1%, 1%, 5%, 10%, or 25% of the total pixels of the depth image.

Upon the controller 118 determining the aspect ratio of the group 608 is within the specified bounds, the controller 118 may move to block 708. Upon the controller 118 determining the aspect ratio of the group 608 is not within specified bounds, the controller 118 returns to block 702 and does not filter the group 608.

Block 708 includes the controller 118 determining if the group 608 touches a border of the segmented depth image 712. For example, with reference to FIGS. 6A-B, the object 604 and corresponding group 608-5 touches the leftmost border of the raw depth image 602 and the leftmost border of the segmented depth image, respectively. The object 604 may comprise a portion of a larger object which is beyond the field of view of the depth camera 202. Accordingly, removal of this object 604 (i.e., removal of pixels corresponding to group 608-5) may be dangerous as the controller 118 may not receive adequate data to determine if the object is produced due to incorrect localization (e.g., as shown by object 316) or if the object is part of a larger object beyond the visual scene. Conversely, group 608-3 does not touch any border of the depth image 602 and may therefore be filtered/removed from the segmented image 610.

Upon the controller 118 determining a group, e.g., 608-3, does not touch a border of the depth image 712, the controller 118 may move to block 710. Upon the controller 118 determining a group 608, e.g., 608-5, does touch a border of the depth image 712, the controller 118 returns to block 702 and does not filter the group 608.

Block 710 includes the controller 118 filtering the group 608 from the segmented depth image 712. The filtering may include, without limitation, setting distance measurements corresponding to pixels of the group 608 to "no measurement" or "no value" values, ignoring the distance measurements during mapping using the depth image, or otherwise omitting or ignoring the depth measurements of the pixels of group 608. By way of visual example, in FIG. 6B, groups 608-1, 608-2, 608-4, and 608-5 of the segmented depth image 610 may be retained (i.e., not filtered) while group 608-3 may be filtered.

It is appreciated by one skilled in the art that steps of blocks 704-708 are mutually exclusive and may be executed by the controller 118 in any order, wherein the illustrated order is not intended to be limiting.

Advantageously, the three criteria illustrated in blocks 704-708 configure the controller 118 to identify groups 608 corresponding to incorrectly localized objects which are beyond the maximum measurable range of the depth camera 202 but are localized within the measurable range. Further, method 700 configures the controller 118 to only filter groups 608 of which the depth image 712 provides a full context thereof. For example, object 604 and group 608-5 shown in FIG. 6A-B would not be filtered as the controller 118 may not receive enough information from the depth image 602 alone to determine if the object 604 is the result of incorrect localization or a portion of a larger object of which the robot 102 is to avoid. Lastly, the aspect ratio criterion may enable operators of robots 102 to tune the number of filtered pixels to a maximum amount, wherein remaining pixels are required for safe navigation of the robot 102.

FIG. 8A-D illustrate two non-limiting exemplary embodiments of robots 102 utilizing depth cameras 202 to navigate about their environments. First, in FIG. 8A, a robot 102 comprises a robot configurable to navigate upon a vertically oriented surface 804 such as, for example, walls or glass windows of a building (e.g., a robotic window cleaner). The robot 102 may be suspended upon the vertically oriented surface 804 via cables 802 or other support means (e.g., suction cups). The robot 102 may produce depth imagery comprising distance measurements of a visual scene surrounding the robot 102; the depth imagery is shown next in FIG. 8B.

Figure 8B:
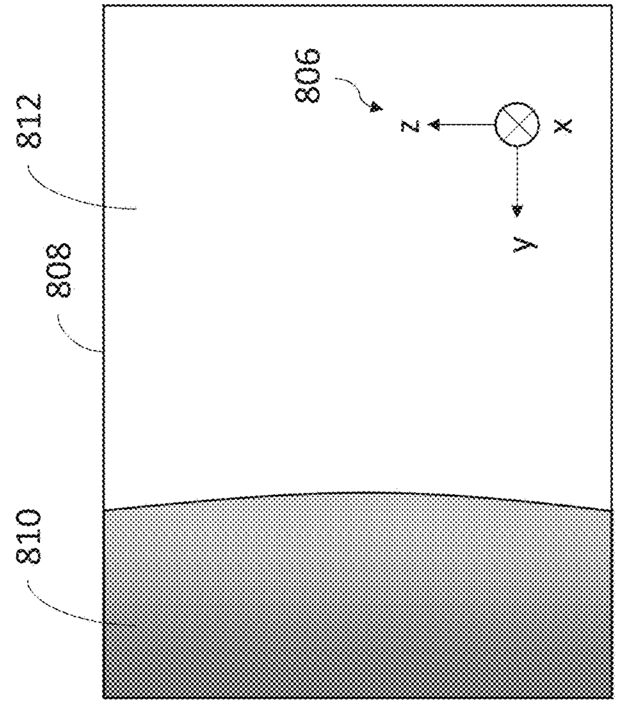
FIG. 8A-B illustrate another embodiment of a robot which utilizes depth cameras to illustrate which regions of depth imagery may include incorrectly localized objects, according to exemplary embodiments.
Figure 8A:
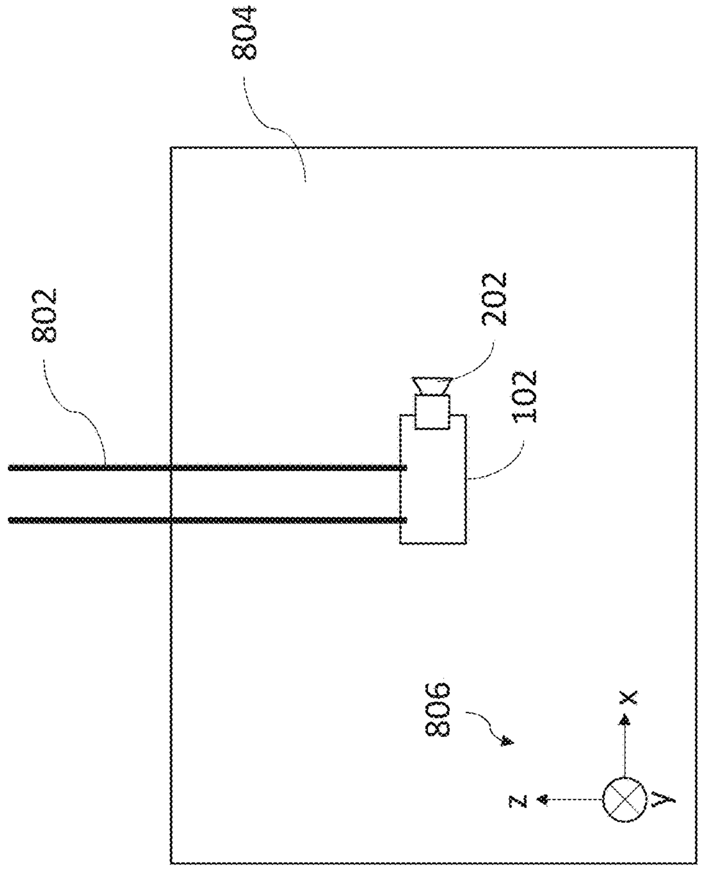

FIG. 8B illustrates an exemplary depth image 808 from the robot 102 illustrated in FIG. 8A, according to an exemplary embodiment. The depth image 808 may comprise two regions: a first, persistent region 810 corresponding to a region of pixels wherein depth values are almost always measured; and a second region 812 corresponding to a region of pixels wherein depth values are almost never measured. The region 812 may be configured such that, if an object comes into range of the depth camera 202, the robot 102 may be able to respond (e.g., change its trajectory). The region 810 may depict distance measurements to the vertically oriented surface 804. Accordingly, pixels within region 812 may correspond to the "specified region" of block 704, wherein groups of pixels 608 which do not meet the remaining two criteria (e.g., blocks 706, 708) may be filtered from the depth image 808.

One skilled in the art may appreciate that there may be a plurality of different robot 102 configurations and depth camera 202 orientations which change the shape, size, and/or presence of regions 810, 812 in depth images produced by these depth cameras 202. Advantageously, predetermining a region 812 corresponding to portions of a field of view of a depth camera 202 wherein distance measurements are typically not received may enhance a rate at which controller 118 may execute block 704 and method 700. Provided the depth camera 202 does not change its pose over time, the region 810 may remain the same over time.

Figure 9:
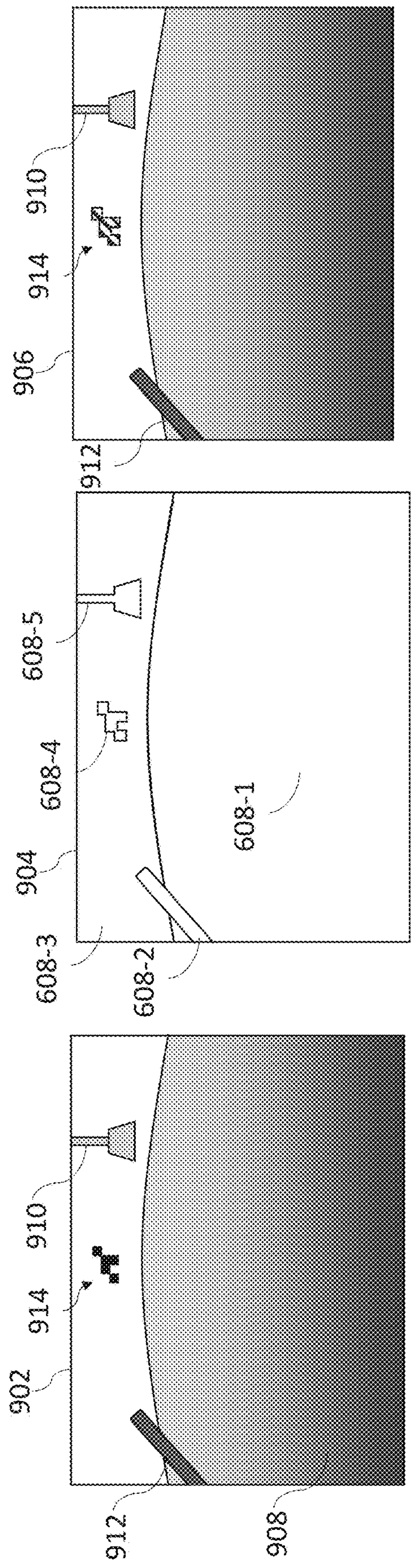
FIG. 9 illustrates a raw depth image, a segmented depth image, and a processed depth image in accordance with some embodiments of the present disclosure.

To summarize the above disclosure using an illustrative example of methods 500 and 700, FIG. 9 illustrates three depth images captured by a depth camera 202: a raw depth image 902, a segmented depth image 904, and a processed depth image 906, according to an exemplary embodiment. As used above, dark or black pixels may represent small distance measurements, light grey pixels may represent large distance measurements, and white pixels may represent no distance measurements (i.e., no objects are within measurable range of the depth camera 202).

Raw depth image 902 may be received from a depth camera 202 on a robot 102. The robot 102 may navigate upon a floor and, using the depth camera 202, measure distances to various objects 908, 910 within the scene. The floor is depicted by pixels 908, wherein the floor is depicted with a gradient showing both the floor nearby the robot 102 and further away from the robot 102. The objects 910 and 912 may include, for example, a broomstick and a lamp, both of which are only partially imaged by the raw depth image 902. In addition to the two objects 910 and 912 depicted, a plurality of pixels 914 comprising small distance measurements (shown in black) may be detected. These small distance measurements may be the result of either (i) a small object substantially close to the depth camera 202, or (ii) erroneous underestimations of distances due to a periodicity of pulse patterns 214 of beams 208 emitted from the depth camera 202. For example, the pixels 914 may be the result of beams 208 reflecting off of a reflective surface, such as a glossy wall, mirror, glass, or other reflective object (e.g., 314) which is beyond the maximum distance of the depth camera 202. These beams 208 may be incident on the reflective surfaces at substantially normal angles. Beams 208 which are not of normal incidence to the reflective surfaces may be reflected away from the depth camera 202 and, thereby, generate no distance measurements (white).

The controller 118 of the robot 102 may, prior to utilizing the raw depth image 902 to navigate or produce maps of the environment, filter the raw depth image 902 for any erroneously localized pixels. The controller 118 may, following method 700, produce a segmented depth image 904. The segmented depth image 904 includes a plurality of groups 608. The groups 608 may be produced based on pixels of the groups 608 comprising similar distance measurements, color values, proximity/location within the image, and/or other parameters discussed above. For example, group 608-1 may represent the floor, 608-2 may represent the object 912, group 608-3 may represent the "no measurement" pixels, group 608-4 may represent pixels 914, and group 608-5 may represent object 910. Controller 118 may subsequently apply the criterion outlined in FIG. 7 above to each group 608 of pixels to determine if any group 608 includes erroneous measurements. The "specified region" in this embodiment (block 704) may include the top half, third, or quarter of the raw depth image 902 as this region, absent any objects (aside from a floor), does not receive returning distance measurements due to beams 208 emitted in this portion of the field of view not reflecting off of any objects or the floor back to the detector 206.

By way of visualization, group 608-1 is not within the specified region. Accordingly, group 608-1 does not meet the criterion for removal and is retained within the final processed depth image 906.

Group 608-2 is at least in part within the specified region, but touches the left boundary of the segmented depth image 904. Accordingly, group 608-2 does not meet the criterion for removal and is retained within the final processed depth image 906.

Group 608-3 is within the specified region, but again touches the left, right, and top boundaries of the segmented depth image 904. Further, group 608-3 is substantially large such that removal of such a large region may pose additional risk to the robot 102 due to the lack of depth information. Stated differently, group 608-3 exceeds the aspect ratio bounds outlined in block 706. Accordingly, group 608-3 does not meet the criterion for removal and is retained within the final processed depth image 906.

Group 608-4 is within the specified region of the segmented depth image 904 and does not touch any of the left, right, upper, or lower boundaries. Further, group 608-4 is sufficiently small (e.g., less than 10% of the image) such that its removal may not pose significant risk to the robot 102 and may fall within the aspect ratio bounds shown in block 706. Accordingly, group 608-3 does meet the criterion for removal and is filtered from the final processed depth image 906.

Lastly, group 608-5 is within the specified region, but touches the upper boundary of the image. Accordingly, group 608-5 does not meet the criterion for removal and is retained within the final processed depth image 906.

Accordingly, the controller 118 may produce the processed depth image 906. Processed depth image 906 retains both objects 912 and 910 while removing pixels 914. Accordingly, depth data from all pixels of the processed image 906, excluding pixels 914, may be utilized by the controller 118 to map the environment and/or navigate the robot 102.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure, and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, un-recited elements or method steps; the term "having" should be interpreted as "having at least"; the term "such as" should be interpreted as "such as, without limitation"; the term 'includes" should be interpreted as "includes but is not limited to"; the term "example" or the abbreviation "e.g." is used to provide exemplary instances of the item in discussion, not an exhaustive or limiting list thereof, and should be interpreted as "example, but without limitation"; the term "illustration" is used to provide illustrative instances of the item in discussion, not an exhaustive or limiting list thereof, and should be interpreted as "illustration, but without limitation." Adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

What is claimed is:

1. A method for filtering erroneous distance measurements from a sensor, comprising:

receiving a depth image from a depth camera;

segmenting, via a controller, the depth image into a plurality of groups based on at least one of color values or distance values of the depth image, each group of the plurality of groups comprises one or more pixels of the depth image and one or more respective distance measurements;

determining, via the controller, if a respective one of the plurality of groups meets following criterion:

(i) the respective group is within a specified region of a field of view of the depth camera;

(ii) the respective group comprises an aspect ratio within specified bounds; and (iii) the respective group does not touch border of the depth image; and filtering, via the controller, the respective group from the depth image to produce a filtered depth image if the criterion is satisfied by the respective group.

2. The method of claim 1, further comprising:

utilizing, via the controller, the distance measurements of the filtered depth image to produce a computer readable map, the computer readable map being utilized by the controller to navigate a robot.

3. The method of claim 1, wherein the specified bounds of the aspect ratio are greater than or equal to at least one pixel.

4. The method of claim 1, wherein the depth image includes a persistent region and the specified region, the persistent region corresponding to a portion of the field of view which is within a maximum range of the depth camera, the specified region includes a remaining portion of the field of view.

5. The method of claim 4, wherein, the persistent region corresponds to the portion of the field of view of a floor upon which a robot operates, the floor is within the maximum range of the depth camera.

6. A robotic system for filtering erroneous distance measurements from a sensor, comprising:

a memory comprising a plurality of computer-readable instructions stored thereon; and a controller configured to execute the computer-readable instructions to:

receive a depth image from a depth camera;

segment the image into a plurality of groups based on at least one of color values or distance values of the depth image, each group comprises one or more pixels of the image and one or more respective distance measurements;

determine if a respective group of the plurality of groups meets following criterion:

(i) the respective group is within a specified region of a field of view of the depth camera;

(ii) the respective group comprises an aspect ratio within specified bounds; and (iii) the respective group does not touch border of the depth image; and filter the respective group from the depth image to produce a filtered depth image if the criterion is satisfied by the respective group.

7. The robotic system of claim 6, wherein the controller is further configured to execute the computer-readable instructions to:

utilize the distance measurements of the filtered depth image to produce a computer readable map, the computer readable map being utilized by the controller to navigate the robotic system.

8. The robotic system of claim 6, wherein the specified bounds of the aspect ratio include a minimum value of at least one pixel.

9. The robotic system of claim 6, wherein the depth image include a persistent region and the specified region, the persistent region corresponding to a portion of the field of view which is within a maximum range of the depth camera, the specified region includes a remaining portion of the field of view.

10. The robotic system of claim 9, wherein, the robotic system operates upon a floor; and the persistent region corresponds to the portion of the field of view which includes the floor within the maximum range of the depth camera.

11. A non-transitory computer readable storage medium comprising a plurality of computer-readable instructions stored thereon, which when executed by at least one controller of a robot, cause the robot to, receive a depth image from a depth camera coupled to the robot;

segment the depth image into a plurality of groups based on at least one of color values or distance values of the depth image, each group of the plurality of groups comprises one or more pixels of the depth image and one or more respective distance measurements;

determine if a respective group of the plurality of groups meets following criterion:

(i) the respective group is within a specified region of a field of view of the depth camera;

(ii) the respective group comprises an aspect ratio within specified bounds; and (iii) the respective group does not touch border of the depth image; and filter the group from the depth image to produce a filtered depth image if the criterion is satisfied by the respective group.

12. The non-transitory computer readable storage medium of claim 11, wherein the at least one controller is further configured to execute the computer-readable instructions to:

utilize the distance measurements of the filtered depth image to produce a computer readable map, the computer readable map being utilized by the controller to navigate the robot.

13. The non-transitory computer readable storage medium of claim 11, wherein the specified bounds of the aspect ratio include a minimum value of at least one pixel.

14. The non-transitory computer readable storage medium of claim 11, wherein the depth image includes a persistent region and the specified region, the persistent region corresponding to a portion of the field of view which is within a maximum range of the depth camera, the specified region includes a remaining portion of the field of view.

15. The non-transitory computer readable storage medium of claim 14, wherein, the robot operates upon a floor; and the persistent region corresponds to the portion of the field of view which includes the floor within the maximum range of the depth camera.

* * * * *